US012576617B2

(12) United States Patent
Amie et al.

(10) Patent No.: US 12,576,617 B2
(45) Date of Patent: Mar. 17, 2026

(54) MEMBER FOR DISPLAY DEVICE, OPTICAL STACKED BODY, AND DISPLAY DEVICE

(71) Applicant: DAI NIPPON PRINTING CO., LTD., Tokyo (JP)

(72) Inventors: Takashi Amie, Tokyo (JP); Takanori Maeda, Tokyo (JP); Makoto Nanaumi, Tokyo (JP); Kazuyoshi Satake, Tokyo (JP); Yoshiyuki Ono, Tokyo (JP); Yosuke Wada, Tokyo (JP); Keisuke Wakita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 33 days.

(21) Appl. No.: 17/905,394

(22) PCT Filed: Mar. 2, 2021

(86) PCT No.: PCT/JP2021/007902

§ 371 (c)(1),
(2) Date: Aug. 31, 2022

(87) PCT Pub. No.: WO2021/177288

PCT Pub. Date: Sep. 10, 2021

(65) Prior Publication Data

US 2023/0311456 A1 Oct. 5, 2023

(30) Foreign Application Priority Data

Mar. 5, 2020 (JP) ................................ 2020-037853
Mar. 31, 2020 (JP) ................................ 2020-064754

(51) Int. Cl.
*B32B 17/10* (2006.01)
*B32B 7/12* (2006.01)
(Continued)

(52) U.S. Cl.
CPC ................ *B32B 17/10* (2013.01); *B32B 7/12* (2013.01); *B32B 27/36* (2013.01);
(Continued)

(58) Field of Classification Search
CPC ........... B32B 17/10; B32B 7/12; B32B 27/36; B32B 2307/7376; B32B 2255/26;
(Continued)

(56) References Cited

U.S. PATENT DOCUMENTS

2012/0196103 A1* 8/2012 Murashige .......... C03C 17/3405 156/60
2014/0017500 A1* 1/2014 Koike ..................... C03C 21/00 428/410
(Continued)

FOREIGN PATENT DOCUMENTS

CN 107848264 3/2018
CN 108877529 11/2018
(Continued)

OTHER PUBLICATIONS

WO 2014046180 A9 Machine Translation (Year: 2014).*
JP 2018104682 Machine Translation (Year: 2018).*
JP 2019132930 Machine Translation (Year: 2019).*

*Primary Examiner* — Travis M Figg
(74) *Attorney, Agent, or Firm* — HSML P.C.

(57) ABSTRACT

The present disclosure provides a member for a display device comprising: a glass substrate with a thickness of 100 μm or less; and a resin layer placed on one surface side of the glass substrate, a composite elastic modulus of the resin layer is 5.7 GPa or more, and a thickness of the resin layer is 5 μm or more and 60 μm or less.

16 Claims, 7 Drawing Sheets

(51) Int. Cl.

| | |
|---|---|
| ***B32B 27/36*** | (2006.01) |
| ***C03C 17/34*** | (2006.01) |
| ***C08J 5/18*** | (2006.01) |
| ***C08J 7/046*** | (2020.01) |
| ***G02B 1/14*** | (2015.01) |
| ***G02B 1/18*** | (2015.01) |

(52) U.S. Cl.

CPC ............ *C03C 17/3405* (2013.01); *C08J 5/18* (2013.01); *C08J 7/046* (2020.01); *G02B 1/14* (2015.01); *G02B 1/18* (2015.01); *B32B 2255/26* (2013.01); *B32B 2255/28* (2013.01); *B32B 2307/41* (2013.01); *B32B 2307/54* (2013.01); *B32B 2307/558* (2013.01); *B32B 2307/7376* (2023.05); *B32B 2457/20* (2013.01); *C03C 2217/78* (2013.01); *C08J 2379/08* (2013.01)

(58) Field of Classification Search

CPC ........... B32B 2255/28; B32B 2307/41; B32B 2307/54; B32B 2307/558; B32B 2457/20; G02B 1/14; G02B 1/18; C08J 7/046; C08J 5/18; C08J 2379/08; C03C 17/3405; C03C 2217/78

USPC .......................................................... 428/216

See application file for complete search history.

(56) References Cited

U.S. PATENT DOCUMENTS

| | | | | |
|---|---|---|---|---|
| 2015/0010742 | A1* | 1/2015 | Han | B32B 27/302 428/335 |
| 2018/0203173 | A1 | 7/2018 | Murashige et al. | |
| 2018/0319696 | A1* | 11/2018 | Akiba | C03C 21/002 |
| 2020/0198302 | A1 | 6/2020 | Murashige et al. | |
| 2021/0178740 | A1 | 6/2021 | Murashige et al. | |

FOREIGN PATENT DOCUMENTS

| | | | | | |
|---|---|---|---|---|---|
| JP | 2011-088789 | | | 5/2011 | |
| JP | 2013-212633 | | | 10/2013 | |
| JP | 2016-083926 | | | 5/2016 | |
| JP | 2018104682 | A | * | 7/2018 | |
| JP | 2018-188335 | | | 11/2018 | |
| JP | 2019-137864 | | | 8/2019 | |
| JP | 2019132930 | A | * | 8/2019 | |
| KR | 10-2012-0073286 | | | 7/2012 | |
| KR | 10-2015-0004496 | | | 1/2015 | |
| WO | WO-2014046180 | A9 | * | 5/2014 | C08L 79/08 |
| WO | 2019/087938 | | | 5/2019 | |

* cited by examiner

MEMBER FOR DISPLAY DEVICE, OPTICAL STACKED BODY, AND DISPLAY DEVICE

TECHNICAL FIELD

The present disclosure relates to a member for a display device, an optical stacked body, and a display device.

BACKGROUND ART

In order to protect a display device, a cover member made of glass or resin is conventionally used for the display device. This cover member is configured to protect the display device from an impact or a scratch, and a strength, an impact resistance, and a scratch resistance, for example, are required. The cover member made of glass has features such as high surface hardness so that it is unlikely to get scratched, and high transparency. Meanwhile, the cover member made of resin has features such as light weight, and chip-proof. Generally, the thicker the thickness of the cover member, higher in function to protect the display device form an impact. The quality of the material and the thickness of the cover member is appropriately selected and used in view of, for example, weight, cost, and size of the display device.

In recent years, a flexible display such as a foldable display, a rollable display, and a bendable display have been actively developed. Among them, the foldable display, in other words, a display device which can be folded has been developed.

In the display device which can be folded, since a cover member is also required to be bent so as to conform the movement of the display device, a cover member which can be folded is applied. As for a resin cover member, a polyimide or polyamideimide film that is made colorless and transparent by a well-crafted chemical structure has been developed (for example, refer to Patent Document 1). Also, as for a glass cover member, a cover member wherein glass is made foldable by thinning such as ultra-thin plate glass (Ultra-Thin Glass; UTG) is under investigation (for example, refer to Patent Document 2). Among the glass, one referred to as chemically strengthened glass has particularly high bending resistance, and the glass is made chip-proof by internalizing an expansive stress on the glass surface so that a minute scratch occurred in the glass surface does not grow when bent.

CITATION LIST

Patent Documents

Patent Document 1: Japanese Patent Application Laid-Open (JP-A) No. 2019-137864

Patent Document 2: JP-A No. 2018-188335

SUMMARY OF DISCLOSURE

Technical Problem

Since the elastic modulus of glass is higher compared to resin, when they have the same thickness, the glass has higher ability to protect the display device than the resin. Also, the glass is high in optical transparency, and thus a display device having better visibility may be produced. Meanwhile, when the glass is thinned, it is more likely to be cracked so that impact resistance is drastically deteriorated. When the glass of the cover member is cracked by an impact from outside, not only the function to protect the display device is deteriorated, but also there is a risk of injuring the user's fingertip or the like with an arisen shard or a sharp edge.

The present disclosure has been made in view of the above circumstances, and the first object of the present disclosure is to provide a member for a display device, an optical stacked body, and a display device comprising the same, those are excellent in impact resistance and flexibility wherein safety thereof is also improved. Also, the second object of the present disclosure is to provide a member for a display device, and a display device comprising the same, those are excellent in strength, impact resistance, scratch resistance, and flexibility wherein safety thereof is also improved.

Solution to Problem

One embodiment of the present disclosure provides a member for a display device comprising: a glass substrate with a thickness of 100 μm or less; and a resin layer placed on one surface side of the glass substrate, a composite elastic modulus of the resin layer is 5.7 GPa or more, and a thickness of the resin layer is 5 μm or more and 60 μm or less.

In the member for a display device in the present disclosure, a primer layer may be included between the glass substrate and the resin layer.

Also, in the member for a display device in the present disclosure, a functional layer may be included on the resin layer, on an opposite surface side to the glass substrate. In this case, the functional layer may be a hard coating layer.

In the member for a display device in the present disclosure, a total light transmittance thereof is preferably 80% or more. Also, in the member for a display device in the present disclosure, a haze thereof is preferably 2.0% or less.

Also, in the member for a display device in the present disclosure, the resin layer may include a polyimide or a polyamideimide. In this case, a weight average molecular weight of the polyimide is preferably 100,000 or more. Also, a weight average molecular weight of the polyamideimide is preferably 50,000 or more.

Another embodiment of the present disclosure provides an optical stacked body comprising a glass substrate, a first resin layer, a second resin layer, and a third resin layer, in this order, wherein a thickness of the glass substrate is 100 μm or less; a composite elastic modulus of the first resin layer is 5.7 GPa or more, and a thickness of the first resin layer is 5 μm or more and 60 μm or less; the second resin layer is a pressure-sensitive adhesive layer; and the third resin layer is a resin film including a resin selected from a group consisting of a polyester based resin, a polycycloolefin based resin, an acetylcellulose based resin, a polycarbonate based resin, and a polypropylene based resin.

In the optical stacked body in the present disclosure, a total thickness of the resin layers placed on a first resin layer surface side of the glass substrate is preferably 143 μm or less.

In the optical stacked body in the present disclosure, a functional layer may be included on the third resin layer, on an opposite surface side to the second resin layer. In this case, the functional layer may be a hard coating layer.

In the optical stacked body in the present disclosure, a total light transmittance thereof is preferably 80% or more. Also, in the optical stacked body in the present disclosure, a haze thereof is preferably 2.0% or less.

Also, in the optical stacked body in the present disclosure, the first resin layer may include a polyimide or a polyamideimide. In this case, a weight average molecular weight of the polyimide is preferably 100,000 or more. Also, a weight average molecular weight of the polyamideimide is preferably 50,000 or more.

Another embodiment of the present disclosure provides a display device comprising: a display panel, and the member for a display device described above or the optical stacked body described above placed on an observer side of the display panel.

The display device in the present disclosure is preferably foldable.

Advantageous Effects of Disclosure

The present disclosure has an effect that a member for a display device, and an optical stacked body, those are excellent in impact resistance and flexibility wherein safety thereof is also improved, may be provided. Also, the present disclosure has an effect that a member for a display device excellent in strength, impact resistance, scratch resistance, and flexibility wherein safety thereof is also improved, may be provided.

DESCRIPTION OF EMBODIMENTS

Figure 1:
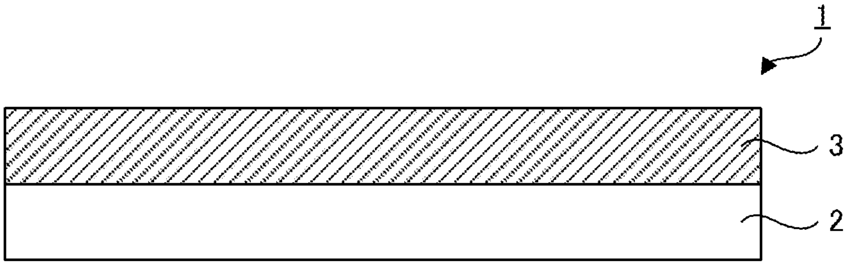
FIG. 1 is a schematic cross-sectional view illustrating an example of the member for a display device in the present disclosure.

Embodiments in the present disclosure are hereinafter explained with reference to, for example, drawings. However, the present disclosure is enforceable in a variety of different forms, and thus should not be taken as is limited to the contents described in the embodiments exemplified as below. Also, the drawings may show the features of the present disclosure such as width, thickness, and shape of each part schematically comparing to the actual form in order to explain the present disclosure more clearly in some cases; however, it is merely an example, and thus does not limit the interpretation of the present disclosure. Also, in the present description and each drawing, for the factor same as that described in the figure already explained, the same reference sign is indicated and the detailed explanation thereof may be omitted.

In the present descriptions, in expressing an aspect wherein some member is placed on the other member, when described as merely “on” or “below”, unless otherwise stated, it includes both of the following cases: a case wherein some member is placed directly on or directly below the other member so as to be in contact with the other member, and a case wherein some member is placed on the upper side or the lower side of the other member via yet another member. Also, in the present descriptions, on the occasion of expressing an aspect wherein some member is placed on the surface of the other member, when described as merely “on the surface side” or “on the surface”, unless otherwise stated, it includes both of the following cases: a case wherein some member is placed directly on or directly below the other member so as to be in contact with the other member, and a case wherein some member is placed on the upper side or the lower side of the other member via yet another member.

Also, in the present descriptions, a member referred to as “sheet” is also included in “film”.

A member for a display device, an optical stacked body, and a display device in the present disclosure are hereinafter described in detail.

A. Member for a Display Device

In order to solve the problem, as the result of intensive studies, the inventors of the present disclosure have found out that the crack of a glass substrate may be suppressed and impact resistance may be improved by using a thin flexible glass substrate, and by placing a resin layer on one surface side of the glass substrate. Further, they have found out that the crack of the glass substrate may further be suppressed and impact resistance may further be improved by increasing the thickness of the resin layer. However, they have found out that, in a case where a member for a display device wherein a resin layer is placed on one surface side of a glass substrate, is placed on the observer side of a display panel in a display device, when the member for a display device is placed so that the resin layer side surface is on the observer side, the hardness of the resin layer side surface of the member for a display device may be decreased and the scratch resistance may be decreased, if the thickness of the resin layer is thick. Thus, the inventors of the present disclosure have carried out further investigation and found out that, even when the thickness of the resin layer is relatively thin in order to improve the surface hardness, by setting the composite elastic modulus of the resin layer in a predetermined range, the crack of the glass substrate may be suppressed. That is, they have found out that a member for a display device excellent in all of strength, impact resistance, scratch resistance, and flexibility may be obtained. Also, they have found out that, by using a resin layer having a predetermined property, a shard or sharp edge is not exposed even when the glass substrate is broken so that safer use is possible. The member for a display device in the present disclosure is based on such findings.

The member for a display device in the present disclosure comprises: a glass substrate with a thickness of 100 μm or less; and a resin layer placed on one surface side of the glass substrate, a composite elastic modulus of the resin layer is 5.7 GPa or more, and a thickness of the resin layer is 5 μm or more and 60 μm or less.

FIG. 1 is a schematic cross-sectional view illustrating an example of a member for a display device in the present disclosure. As shown in FIG. 1, member for a display device 1 comprises glass substrate 2, and resin layer 3 placed on one surface side of the glass substrate 2. The glass substrate 2 has a predetermined thickness, and the resin layer 3 has a predetermined thickness and a predetermined composite elastic modulus.

Since the thickness of the glass substrate in the present disclosure is the predetermined value or less, and the thickness is thin, there is a concern that it is easily cracked, and low in impact resistance. However, since the resin layer is placed on one surface side of the glass substrate, when an impact is applied to the member for a display device, the resin layer may absorb the impact and a crack of the glass substrate may be suppressed so that the impact resistance may be improved. Further, even when the glass substrate is broken, the resin layer may suppress glass from being scattered.

Here, when the thickness of the resin layer is increased, the crack of the glass substrate may further be suppressed so that impact resistance may further be improved. However, when the thickness of the resin layer is thick, the hardness of the resin layer side surface of the member for a display device is decreased so that the scratch resistance is decreased. Therefore, in order to increase the hardness of the resin layer side surface of the member for a display device, the thickness of the resin layer is required to be relatively thin. According to the present disclosure, by the composite elastic modulus of the resin layer being in the predetermined range, a crack of the glass substrate may be suppressed, even when the thickness of the resin layer is relatively thin in order to increase the surface hardness. Therefore, both of impact resistance and scratch resistance may be improved.

Incidentally, as described later, the composite elastic modulus of the resin layer is measured by a nanoindentation method (indentation test method). Also, a pen dropping test may be listed as an evaluation of the impact resistance of a thin glass substrate, and as described in Examples below, the impact resistance of a member for a display device may be evaluated by the pen dropping test. As for the elastic modulus, although there are various elastic moduli besides the composite elastic modulus, the composite elastic modulus of the resin layer is employed in the present disclosure. This is because, pressing an indenter onto a measurement sample, in the measurement of the composite elastic modulus of the resin layer by the nanoindentation method (indentation test method), is similar to a pen tip being crashed and pressed into the sample in the pen dropping test.

According to the present disclosure, by the composite elastic modulus of the resin layer being the predetermined value or more, impact resistance by the pen dropping test may be improved.

Also, according to the present disclosure, since the thickness of the glass substrate is the predetermined value of less so as to be thin, and the thickness of the resin layer is in the predetermined range so as to be relatively thin, flexibility may be increased. Therefore, when the member for a display device is bent, a crack of the resin layer may be suppressed so that the bending resistance may be maintained. For the reasons described above, the member for a display device in the present disclosure is foldable so that it may be used as a member for a display device in a widely varying style; for example, it may be used as a member for a foldable display.

Also, according to the present disclosure, since the composite elastic modulus of the resin layer is the predetermined value or more, the restoring force when the resin layer is deformed, may be increased. Incidentally, the composite elastic modulus is an index indicating difficulty in being deformed. The higher the composite elastic modulus of the resin layer, the higher the restoring force when the resin layer is deformed. Meanwhile, the lower the composite elastic modulus of the resin layer, the lower the restoring force when the resin layer is deformed. Therefore, by the composite elastic modulus of the resin layer being the predetermined value or more, the restoring property after the member for a display device is kept under a bent condition for a long time, may be increased. Also, the storing property after the member for a display device is folded repeatedly, may be increased.

As described above, the present disclosure is able to provide a member for a display device excellent in strength, impact resistance, scratch resistance, and flexibility. Further, even when the glass substrate is broken, a risk of a human body being injured may be decreased so that a member for a display device with greater safety may be provided.

Also, although an optical film provided with a resin substrate is also conventionally known as a member to be placed on the surface of a foldable display, in a foldable display using the optical film as the member, there are problems that a folding mark is likely to be marked, quality of an image is deteriorated, and the appearance thereof is deteriorated. In contrast to this, a glass substrate is used in the present disclosure, and in a member for a display device using the glass substrate, the folding mark is less likely to be marked, quality of an image is improved, and the appearance thereof is improved.

Each constitution of the member for a display device in the present disclosure is hereinafter described.

1. Resin Layer

The resin layer in the present disclosure is a member wherein the composite elastic modulus thereof is 5.7 GPa or more, the thickness is 5 μm or more and 60 μm or less, and is placed on one surface side of the glass substrate. The resin layer is a member having an impact absorbing property, and also functions as a member suppressing glass from being scattered, when the glass substrate is broken. The resin layer has light transparency, and when the resin layer is placed on the observer side of the display panel of the member for a display device in the present disclosure, the resin layer is placed on the observer side than the glass substrate.

(1) Properties of Resin Layer

The composite elastic modulus of the resin layer is 5.7 GPa or more, preferably 6.0 GPa or more, and more preferably 6.5 GPa or more. Even when the thickness of the resin layer is relatively thin in order to improve the surface hardness, by setting the composite elastic modulus of the resin layer in the range, a crack of the glass substrate due to an impact may be suppressed, and impact resistance and scratching resistance may be improved.

Also, according to the composite elastic modulus measurement method described later, since the composite elastic modulus of the glass substrate is approximately 40 GPa, the composite elastic modulus of the resin layer is preferably, for example, 40 GPa or less, and more preferably 20 GPa or less.

Here, the composite elastic modulus of the resin layer is calculated using contact projection area $A_p$ determined when measuring the indentation hardness ($H_{IT}$) of the resin layer. The "indentation hardness" is a value determined from a load-displacement curve from indenter loading to unloading obtained by a hardness measurement by the nanoindentation method. The composite elastic modulus of the resin layer is an elastic modulus including the elastic deformation of the resin layer and the elastic deformation of the indenter.

The measurement of the indentation hardness ($H_{IT}$) is carried out, to a measurement sample, using "TI950 TriboIndenter" from Bruker Corporation. Specifically, at first, a block wherein a member for a display device cut out to a size of 1 mm×10 mm is embedded in an embedding resin is prepared, and a uniform section with a thickness of 50 nm or more and 100 nm or less without a hole, for example, is cut out from this block by a common section preparing method. For the preparation of the section, for example, "Ultramicrotome EM UC7" (from Leica Microsystems, Inc.) may be used. Then, the remaining of the block from which this uniform section without a hole, for example, is cut out is used as a measurement sample. Then, onto the cross-section in such the measurement sample obtained by cutting out the section, a Berkovich indenter (a triangular pyramid, TI-0039 from Bruker Corporation) as the indenter is compressed perpendicularly onto the center of the cross-section of the resin layer, under the following conditions, taking 10 seconds, until the maximum compressing load of 25 μN. Here, in order to avoid an influence of the glass substrate, and in order to avoid an influence of the side edge of the resin layer, the Berkovich indenter shall be compressed into a portion of the resin layer which is 500 nm away from the interface between the glass substrate and the resin layer toward the center side of the resin layer, and 500 nm away from both side edges of the resin layer respectively toward the center side of the resin layer. Incidentally, when an arbitrary layer such as a hard coating layer is present on the resin layer, on the opposite surface to the glass substrate side surface, the Berkovich indenter shall be compressed into a portion of the resin layer which is 500 nm away also from the interface between the arbitrary layer and the resin layer toward the center side of the resin layer. Then, after relieving the remaining stress by maintaining constant, the load was unloaded in 10 seconds, the maximum load after relieving was measured, and by using the maximum load $P_{max}$(μN) and the contact projection area $A_p$ ($nm^2$), the indentation hardness ($H_{IT}$) is calculated by $P_{max}/A_p$. The contact projection area is a contact projection area wherein the indenter tip curvature is corrected by Oliver-Pharr method, using a reference sample fused quartz (5-0098 from Bruker Corporation). The indentation hardness ($H_{IT}$) is an arithmetic average value of the value obtained by measuring at ten places. Incidentally, when a value deviating ±20% or more from the arithmetic average value is included in the measured value, that measured value is excluded, and the measurement is carried out for one more time. Whether the value deviating ±20% or more from the arithmetic average value exists in the measured value, or not is determined by finding out whether the value (%) obtained by (A−B)/B×100, when the measured value is regarded as A and the arithmetic average value is regarded as B, is ±20% or more, or not. The indentation hardness ($H_{IT}$) may be adjusted by the type of the resin, for example, included in the resin layer described later.

(Measurement Conditions)

Loading speed: 2.5 μN/second

Retention time: 5 seconds

Unloading speed: 2.5 μN/second

Measuring temperature: 25° C.

The composite elastic modulus $E_r$ of the resin layer is determined from the following mathematical formula (1), using contact projection area $A_p$ obtained when measuring the indentation hardness. As for the composite elastic modulus, the indentation hardness is measured at 10 places, determining the composite elastic modulus each time, and the arithmetic average value of the obtained composite elastic modulus of 10 places is regarded as the composite elastic modulus.

[Mathematic 1]

$$E_r = \frac{S\sqrt{\pi}}{2\sqrt{A_p}} \quad (1)$$

(In the mathematic formula (1), $A_p$ is a contact projection area, $E_r$ is the composite elastic modulus of the resin layer, and S is a contact stiffness.)

(2) Constitution of Resin Layer

The thickness of the resin layer is 5 μm or more and 60 μm or less, preferably 10 μm or more and 50 μm or less, and more preferably 15 μm or more and 40 μm or less. The flexibility may be improved by the thickness of the resin layer being relatively thin as in the range described above, and when the member for a display device is bent, a crack of the resin layer may be suppressed, and bending resistance may be maintained.

Here, the thickness of the resin layer may be the average value of the thickness of arbitrary 10 points obtained by measuring from the thickness directional cross-section of the member for a display device by observing with a transmission electron microscope (TEM), a scanning electron microscope (SEM), or a scanning transmission electron microscope (STEM). Incidentally, the same may be applied to the measuring methods of the thickness of other layers included in the member for a display device.

Also, the resin layer may be placed only on one surface of the glass substrate, and may be placed so as to cover the two or more surfaces of the glass substrate. Among them, by placing the resin layer so as to cover an edge surface (side surface) of the glass substrate, an impact from the side surface of the glass substrate may be eased, a scratch may be suppressed from occurring, and damage of glass may be suppressed.

(3) Material of Resin Layer (a) Resin

The resin included in the resin layer is not particularly limited as long as it is a resin satisfying the composite elastic modulus described above, and has light transparency; and examples thereof may include polyimide, polyamideimide, acrylic resin, epoxy resin, urethane resin, and triacetyl cellulose (TAC).

The polyimide and polyamideimide are hereinafter explained as examples.

(i) Polyimide

The polyimide is obtained by reacting a tetracarboxylic acid component and a diamine component. It is preferable to obtain a polyamide acid by polymerizing a tetracarboxylic acid component and a diamine component, and imidize thereof. The imidization may be carried out by a chemical imidization, may be carried out by a thermal imidization, and the chemical imidization may be used in conjunction with the thermal imidization.

The polyimide is not particularly limited as long as it satisfies the composite elastic modulus described above and has light transparency; and for example, it preferably includes 10 mol % or more and 100 mol % or less of the constituent unit represented by the following general formula (1), and (100−x) mol % of the constituent unit represented by the following general formula (2) (here, "x" is mol % of the constituent unit represented by the above general formula (1)), and the weight average molecular weight thereof is preferably 100,000 or more. This is because the composite elastic modulus and the bending resistance may be well balanced by the polyimide including a tetracarboxylic acid residue of a specific structure including a parabiphenylene group wherein two ester bond-mediated face angles are twisted, in the main chain thereof, and a diamine residue including an aromatic ring or an alicyclic ring, and also having the specific weight average molecular weight.

[Chemical 1]

General formula (1)

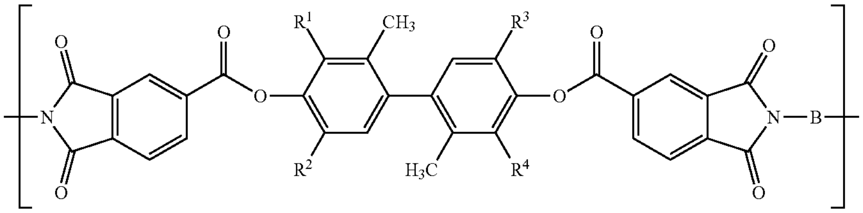

General formula (2)

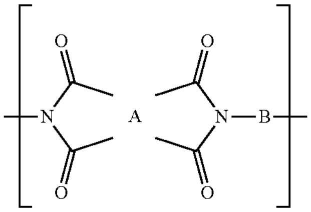

(In the general formulas (1) and (2), $R^1$ to $R^4$ each independently represents a hydrogen atom, or a 1-6C alkyl group; and at least one of $R^1$ and $R^2$, and at least one of $R^3$ and $R^4$ represents a 1-6C alkyl group. "A" represents a tetravalent group which is a tetracarboxylic acid residue including an aromatic ring or an alicyclic ring; and "B" represents a divalent group which is a diamine residue including an aromatic ring or an alicyclic ring.)

Here, "tetracarboxylic acid residue" refers to a residue obtained by excluding four carboxyl groups from a tetracarboxylic acid; and represents the same structure as a residue obtained by excluding an acid dianhydride structure from a tetracarboxylic acid dianhydride. Also, "diamine residue" refers to a residue obtained by excluding two amino groups from a diamine.

In the general formula (1), at least one of $R^1$ and $R^2$, and at least one of $R^3$ and $R^4$ represents a 1-6C alkyl group. The 1-6C alkyl group may be a straight chain, or a branched chain alkyl group; and examples thereof may include a methyl group, an ethyl group, a n-propyl group, an i-propyl group, a n-butyl group, an i-butyl group, a t-butyl group, a n-pentyl group, and a n-hexyl group. From the viewpoint of solvent solubility, a 1-4C alkyl group is preferable, a 1-2C alkyl group is more preferable, and a methyl group is further preferable. Also, among them, from the viewpoint of solvent solubility, $R^1$ and $R^2$, and also $R^3$ and $R^4$ preferably represent a methyl group.

In the general formula (1), "B" represents a divalent group which is a diamine residue including an aromatic ring or an alicyclic ring. The diamine residue including an aromatic ring or an alicyclic ring may be a residue obtained by excluding two amino groups from a diamine including an aromatic ring or a diamine including an alicyclic ring.

Specific examples of the diamine including an aromatic ring and the diamine including an alicyclic ring may include those described in, for example, JP-A No. 2019-132930 and JP-A No. 2019-1989. These may be used alone, and two kinds or more may be mixed and used.

In the general formulas (2), "A" represents a tetravalent group which is a tetracarboxylic acid residue including an aromatic ring or an alicyclic ring; and "B" represents a divalent group which is a diamine residue including an aromatic ring or an alicyclic ring. Since the "B" in the general formula (2) may be similar to the "B" in the general formula (1), the explanation is omitted herein. The "B" in the general formula (1) and the "B" in the general formula (2) may be the same or different from each other.

The tetracarboxylic acid residue in the "A" in the general formula (2) may be a residue obtained by excluding an acid dianhydride structure from a tetracarboxylic acid dianhydride including an aromatic ring, or a residue obtained by excluding an acid dianhydride structure from a tetracarboxylic acid dianhydride including an alicyclic ring.

Specific examples of the tetracarboxylic acid dianhydride including an aromatic ring, and a tetracarboxylic acid dianhydride including an alicyclic ring may include those described in, for example, JP-A No. 2019-132930 and JP-A No. 2019-1989. These may be used alone, and two kinds or more may be mixed and used.

The polyimide preferably includes 10 mol % or more and 100 mol % or less of the constituent unit represented by the general formula (1). From the viewpoint of solubility to a solvent, the polyimide more preferably includes 15 mol % or more, further preferably 25 mol % or more, particularly preferably 50 mol % or more of the constituent unit represented by the general formula (1).

Meanwhile, from the viewpoint of improved surface hardness and light transparency, a copolymer component may be included, and the polyimide may include 95 mol % or less, may include 90 mol % or less, and may include 80 mol % or less of the constituent unit represented by the general formula (1).

Also, the polyimide preferably includes (100−x) mol % of the constituent unit represented by the general formula (2) (here, "x" is mol % of the constituent unit represented by the general formula (1)). From the viewpoint of solubility to a solvent, the polyimide more preferably includes 85 mol % or less, further preferably 75 mol % or less, particularly preferably 50 mol % or less of the constituent unit represented by the general formula (2).

Incidentally, when the polyimide includes 100 mol % of the constituent unit represented by the general formula (1), the content of the constituent unit represented by the general formula (2) is 0 mol %, that is, not included. Although the content of the constituent unit represented by the general formula (2) may be 0 mol %, from the viewpoint of improved surface hardness and light transparency, it may be included as a copolymer component, and the polyimide may include 5 mol % or more, may include 10 mol % or more, and may include 20 mol % or more of the constituent unit represented by the general formula (2).

From the viewpoint of improving light transparency, and also improving surface hardness, at least one of the "A" representing a tetravalent group which is a tetracarboxylic acid residue, and "B" representing a divalent group which is a diamine residue preferably includes an aromatic ring; and preferably includes at least one selected from the group consisting of (i) a fluorine atom, (ii) an aliphatic ring, and (iii) a structure wherein aromatic rings are connected to each other by an alkylene group which may be substituted with a sulfonyl group or a fluorine. When the polyimide includes at least one kind selected from a tetracarboxylic acid residue including an aromatic ring, and a diamine residue including an aromatic ring, the molecular skeleton becomes rigid, the orientation property is increased, and the surface hardness is improved; however, the absorption wavelength of the rigid aromatic ring skeleton tends to be shifted to the longer wavelength side, and the transmittance of the visible light region tends to be decreased. Meanwhile, when the polyimide includes (i) a fluorine atom, light transparency is improved since the electronic state in the polyimide skeleton may be brought to a state wherein a charge transfer is difficult. Also, when the polyimide includes (ii) an aliphatic ring, light transparency is improved since the transfer of a charge in the skeleton may be inhibited by breaking the conjugation of n electrons in the polyimide skeleton. Also, when the polyimide includes (iii) a structure wherein aromatic rings are connected to each other by an alkylene group which may be substituted with a sulfonyl group or a fluorine, light transparency is improved since the transfer of a charge in the skeleton may be inhibited by breaking the conjugation of n electrons in the polyimide skeleton.

Among them, from the viewpoint of improved light transparency and improved surface hardness, at least one of the "A" representing a tetravalent group which is a tetracarboxylic acid residue, and "B" representing a divalent group which is a diamine residue preferably includes an aromatic ring and a fluorine atom; and "B" representing a divalent group which is a diamine residue preferably includes an aromatic ring and a fluorine atom.

In the polyamide, from the viewpoint of light transparency, and bending resistance and surface hardness, the diamine residue including an aromatic ring or an alicyclic ring in the "B" in the general formulas (1) and (2) is preferably at least one kind of divalent group selected from the group consisting of a trans-cyclohexanediamine residue, a trans-1,4-bismethylenecyclohexanediamine residue, a 4,4'-diaminodiphenylsulfone residue, a 3,4'-diaminodiphenylsulfone residue, a 2,2-bis(4-aminophenyl)propane residue, a 3,3'-bis(trifluoromethyl)-4,4'-[(1,1,1,3,3,3-hexafluoropropane-2,2-diyl)bis(4,1-phenyleneoxy)] dianiline residue, a 2,2-bis[3-(3-aminophenoxy)phenyl]-1,1,1,3,3,3-hexafluoropropane residue, a 2,2-bis[4-(4-aminophenoxy)phenyl]-1,1,1,3,3,3-hexafluoropropane residue, and a divalent group represented by the following general formula (3). Particularly, from the viewpoint of the compatibility of light transparency and surface hardness, at least one kind of divalent group selected from the group consisting of a 4,4'-diaminodiphenylsulfone residue, a 3,4'-diaminodiphenylsulfone residue, a 2,2-bis(4-aminophenyl)propane residue, and a divalent group represented by the following general formula (3) is preferable; and a divalent group represented by the following general formula (3) is more preferable. As the divalent group represented by the following general formula (3), $R^5$ and $R^6$ are more preferably a perfluoroalkyl group; among them, a perfluoroalkyl group with carbon number of 1 or more and 3 or less is preferable; a trifluoromethyl group or a perfluoroethyl group is more preferable. Also, as an alkyl group in $R^5$ and $R^6$ in the following general formula (3), an alkyl group with carbon number of 1 or more and 3 or less is preferable; and a methyl group or a ethyl group is more preferable.

[Chemical 2]

General formula (3)

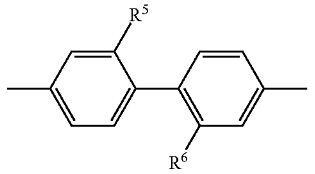

(In the general formula (3), $R^5$ and $R^6$ each independently represents a hydrogen atom, an alkyl group, or a perfluoroalkyl group.)

Among them, in the polyamide, from the viewpoint of light transparency, and bending resistance and surface hardness, the tetracarboxylic acid residue including an aromatic ring or an alicyclic ring in the "A" in the general formula (2) is preferably at least one kind of tetravalent group selected from the group consisting of a cyclohexane tetracarboxylic acid dianhydride residue, a cyclopentane tetracarboxylic dianhydride residue, a dicyclohexane-3,4,3',4'-tetracarboxylic acid dianhydride residue, a cyclobutane tetracarboxylic acid dianhydride residue, a pyromellitic acid dianhydride residue, a 3,3',4,4'-biphenyltetracarboxylic acid dianhydride residue, a 2,2',3,3'-biphenyltetracarboxylic acid dianhydride residue, a 2,3,3',4'-biphenyltetracarboxylic acid dianhydride residue, a 4,4'-(hexafluoroisopropylidene)diphthalic acid anhydride residue, a 3,4'-(hexafluoroisopropylidene)diphthalic acid anhydride residue, a 3,3'-(hexafluoroisopropylidene)diphthalic acid anhydride residue, a 4,4'-oxydiphthalic acid anhydride residue, and a 3,4'-oxydiphthalic acid anhydride residue.

In the "A" in the general formula (2), these preferable residues are preferably included in total of 50 mol % or more, more preferably 70 mol % or more, and further preferably 90 mol % or more.

From the viewpoint of improved surface hardness, as the "A" in the general formula (2), it is preferable to include a tetracarboxylic acid residue group (Group A) suitable for improving rigidity such as at least one kind selected from the group consisting of a pyromellitic acid dianhydride residue, a 3,3',4,4'-biphenyltetracarboxylic acid dianhydride residue, and a 2,2',3,3'-biphenyltetracarboxylic acid dianhydride residue. Also, from the viewpoint of improved light transparency, as the "A" in the general formula (2), it is preferable to include a tetracarboxylic acid residue group (Group B) suitable for improving light transparency such as at least one kind selected from the group consisting of a cyclohexane tetracarboxylic acid dianhydride residue, a cyclopentanetetracarboxylic acid dianhydride residue, a dicyclohexane-3,4,3',4'-tetracarboxylic acid dianhydride residue, a cyclobutane tetracarboxylic acid dianhydride residue, a 2,3,3',4'-biphenyltetracarboxylic acid dianhydride residue, a 4,4'-(hexafluoroisopropylidene)diphthalic acid anhydride residue, a 3,4'-(hexafluoroisopropylidene)diphthalic acid anhydride residue, a 3,3'-(hexafluoroisopropylidene)diphthalic acid anhydride residue, a 4,4'-oxydiphthalic acid anhydride residue, and a 3,4'-oxydiphthalic acid anhydride residue. The Group A and the Group B may be used as a mixture.

When the Group A and the Group B are mixed, in relation to the content ratio of the tetracarboxylic acid residue group suitable for improving rigidity (Group A) and the tetracarboxylic acid residue group suitable for improving light transparency (Group B), with respect to 1 mol of the tetracarboxylic acid residue group suitable for improving light transparency (Group B), the tetracarboxylic acid residue group suitable for improving rigidity (Group A) is preferably 0.05 mol or more and 9 mol or less, more preferably 0.1 mol or more and 5 mol or less, and further preferably 0.3 mol or more and 4 mol or less.

Among them, from the viewpoint of improved surface hardness and improved light transmittance, at least one kind of 4,4'-(hexafluoroisopropylidene)diphthalic acid anhydride residue, and a 3,4'-(hexafluoroisopropylidene)diphthalic acid anhydride residue, including a fluorine atom is preferably used as the Group B.

TOF-SIMS, with respect to the degradant of a polyimide obtained similarly as described above.

From the viewpoint of excellent bending resistance, the weight average molecular weight, determined in terms of polystyrene measured with a gel permeation chromatography, of the polyimide is preferably, for example, 100,000 or more. From the viewpoint of bending resistance, the weight average molecular weight may be 120,000 or more, may be 140,000 or more, and may be 160,000 or more. Meanwhile, from the viewpoint of resistance to a blow hole, the weight average molecular weight is preferably 270,000 or less. Further, from the viewpoint of solubility, the weight average molecular weight may be 250,000 or less, may be 230,000 or less, and may be 210,000 or less.

The weight average molecular weight of the polyimide may be measured by gel permeation chromatography (GPC). Specifically, the polyimide is used as a N-methylpyrrolidone (NMP) solution having a concentration of 0.1% by mass; a 30 mmol % LiBr-NMP solution with a water content of 500 ppm or less is used as a developing solvent; and measurement is carried out using a GPC device (HLC-8120, used column: GPC LF-804 from SHODEX) from Tosoh Corporation, under conditions of a sample injecting amount of 50 μL, a solvent flow amount of 0.4 mL/min, and at 37° C. The weight average molecular weight is determined on the basis of a polystyrene standard sample having the same concentration as that of the sample.

(ii) Polyamideimide

The polyamideimide is not particularly limited as long as it satisfies the composite elastic modulus described above, and has light transparency. For example, it preferably includes a polyimide constituent unit including the constituent unit represented by the following formula (4), and a polyamide constituent unit including the constituent unit represented by the following formula (5).

[Chemical 3]

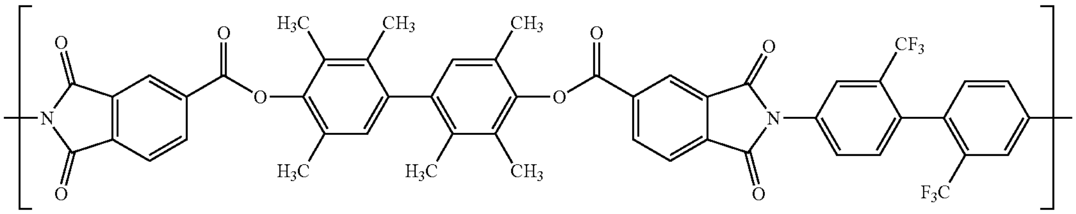

Formula (4)

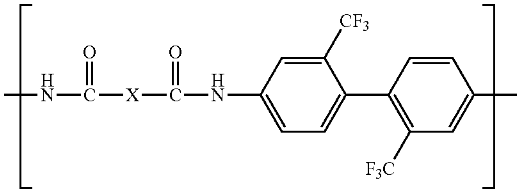

Formula (5)

The content ratio of each repeating unit, and the content ratio (mol %) of each tetracarboxylic acid residue or each diamine residue in the polyimide may be determined from the molecular weight of the charged raw material, when producing the polyimide. Also, the content ratio (mol %) of each tetracarboxylic acid residue or each diamine residue in the polyimide may be determined by using a high-speed liquid chromatography, a gas chromatography mass spectrometry, a NMR, an element analyzer, an XPS/ESCA and a (In the formulas (5), X represents a divalent group which is a dicarboxylic acid residue including an aromatic ring.)

Since the polyamideimide includes a polyimide constituent unit including the constituent unit represented by the formula (4), and the polyamide constituent unit including the constituent unit represented by the formula (5), a resin layer having sufficient transparency, as well as a high composite elastic modulus and bending resistance may be obtained. In the polyamideimide, a polyamide constituent unit including a dicarboxylic acid residue including an aromatic ring and promoting intermolecular interaction due to a hydrogen bond is further introduced into a polyimide constituent unit including a tetracarboxylic acid residue of a specific structure including a parabiphenylene group wherein two ester bond-mediated face angles are twisted, in the main chain thereof, and a specific diamine residue. It is presumed that, by including a twisted aromatic ring in the main chain structure of a polymer, the intermolecular energy transition which takes place at n conjugated polymer may be suppressed so as to achieve sufficient transparency; and by introducing an amide bonding site, and also introducing an ester bonding site into a polyimide constituent unit, an intermolecular force due to the formation of a hydrogen bond may be increased, so that a resin layer having high composite elastic modulus and bonding resistance may be obtained.

Also, the polyamideimide is also excellent in bending resistance particularly under high humidity environment. In the polyamideimide, it is presumed that, since the amide bonding site and the ester bonding site in the polyimide constituent unit form a hydrogen bond, the hydrogen bonding with moisture under high humidity environment may be suppressed, so that the deterioration of bending resistance under the high humidity environment is suppressed, so as to have good bending resistance.

Also, since the polyamideimide includes the constituent unit represented by the formula (4), the solubility to a solvent is excellent even though the constituent unit represented by the formula (4) is included.

(Polyimide Constituent Unit)

The polyimide constituent unit is a constituent unit obtained by reacting a tetracarboxylic acid component and a diamine component; examples thereof may include a constituent unit represented by the general formula (2) described in the section of the polyimide above.

The constituent unit represented by the formula (4) may be obtained by reacting a tetracarboxylic acid dianhydride represented by the following formula (4-1), and a 2,2-bis (trifluoromethyl)-4,4-diaminobiphenyl.

[Chemical 4]

Formula (4-1)

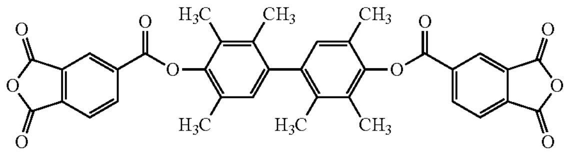

The content ratio of the constituent unit represented by the formula (4), with respect to the total of the polyimide constituent unit in the polyamideimide may be 100 mol %. Also, in the polyimide constituent unit, another polyimide constituent unit different from the constituent unit represented by the formula (4) may be included. The content ratio of the constituent unit represented by the formula (4), with respect to the total of the polyimide constituent unit in the polyamideimide is preferably 50 mol % or more, more preferably 60 mol % or more, and further preferably 70 mol % or more; preferably 100 mol % or less, and may be 90 mol % or less. When the content ratio of the constituent unit represented by the formula (4) is in the above range, sufficient transparency may be exhibited, as well as high composite elastic modulus and bending resistance may be exhibited. In order to improve the balance of transparency, composite elastic modulus, and bending resistance, and to add further properties, another polyimide constituent unit different from the constituent unit represented by the formula (4) may be included.

The content ratio of the tetracarboxylic acid dianhydride residue represented by the formula (4-1), with respect to the total of the tetracarboxylic acid residue included in the polyimide constituent unit in the polyamideimide is preferably 50 mol % or more, more preferably 60 mol % or more, and further preferably 70 mol % or more; preferably 100 mol % or less, and may be 90 mol % or less. When the content ratio of the tetracarboxylic acid dianhydride residue represented by the formula (4-1) is in the above range, sufficient transparency may be exhibited, as well as high composite elastic modulus and bending resistance may be exhibited. In order to improve the balance of transparency, composite elastic modulus, and bending resistance, and to add further properties, another tetracarboxylic acid dianhydride residue different from the tetracarboxylic acid dianhydride residue represented by the formula (4-1) may be included.

Examples of another polyimide constituent unit that may be included in the polyimide constituent unit may include a polyimide constituent unit different form the constituent unit represented by the formula (4), among the constituent unit represented by the general formula (2). In the constituent unit represented by the general formula (2), "A" and "B" may be the same, or may be different in each constituent unit. That is, in the constituent unit represented by the general formula (2), one kind or two kinds or more of "A" and "B" may be included, each independently.

In the constituent unit represented by the general formula (2), "A" represents a tetravalent group which is a tetracarboxylic acid residue including an aromatic ring or an alicyclic ring. Examples of "A" may include a tetravalent group represented by the following formula (a1) to (a7), and a tetravalent group wherein a part of or the all of the hydrogen atoms in the tetravalent group represented by these formulas is substituted with one kind or more of the substituent group selected from the group consisting of a fluoro group, a methyl group, a methoxy group, a trifluoromethyl group and a trifluoromethoxy group.

[Chemical 5]

(a1)

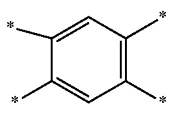

(a2)

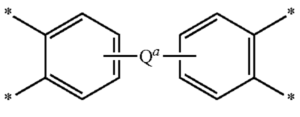

(a3)

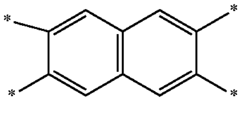

(a4)

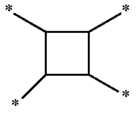

-continued (a5)

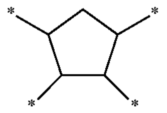

(a6)

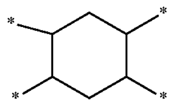

(a7)

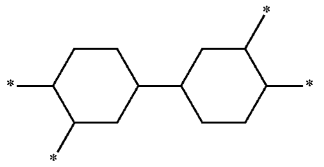

(In the formula (a1) to (a7), represents a bond, $Q^a$ represents a single bond, —O—, —S—, —$CH_2$—, —CH($CH_3$)—, —$C(CH_3)_2$—, —$C(CF_3)_2$—, —CO—, —$SO_2$—, -Ph-, -Ph-$Q^{a2}$-Ph-, -$Q^{a2}$-Ph-$Q^{a2}$-, -$Q^{a2}$-Ph-Ph-$Q^{a2}$-, -$Q^{a2}$-Ph-$Q^{a2}$-Ph-$Q^{a2}$-, or a fluorene group. The "Ph" represents a fluorene group, and $Q^{a2}$ represents —O—, —S—, —$CH_2$—, —$CH(CH_3)$—, —$C(CH_3)_2$—, —$C(CF_3)_2$—, —CO—, or —$SO_2$—).

The bonding positions with respect to each ring of $Q^a$ may include, each independently, an ortho position or a meta position with respect to one of the carboxy group among two carboxy groups bonding to each ring. The bonding positions with respect to each ring of $Q^{a2}$ is preferably, each independently, a meta position or a para position with respect to the phenylene group, and the para position is more preferable.

In the constituent unit represented by the general formula (2), as "A", among the tetravalent group represented by the formula (a1) to (a7), for the structure including an aromatic ring as the formula (a1) to (a3), tetravalent groups represented by the formula (a1) and (a2) are preferable from the viewpoint of imparting transparency and solubility to a solvent. Also, one further including a bendable structure between the aromatic rings is preferable. $Q^a$ in the formula (a2) is preferably —O—, —S—, —$CH_2$—, —$CH(CH_3)$—, —$C(CH_3)_2$—, —$C(CF_3)_2$—, —$SO_2$—, or -$Q^{a2}$-Ph-$Q^{a2}$- ($Q^{a2}$ represents —O—, —S—, —$CH_2$—, —$CH(CH_3)$—, —$C(CH_3)_2$—, —$C(CF_3)_2$—, —CO—, or —$SO_2$—). Further, since transparency is improved when a fluorine atom is included, $Q^a$ is preferably —$C(CF_3)_2$—, or -$Q^{a2}$-Ph-$Q^{a2}$- ($Q^{a2}$ represents —$C(CF_3)_2$—), and from the viewpoint of the composite elastic modulus, among the above, $Q^a$ is more preferably —$C(CF_3)_2$—.

Also, in the constituent unit represented by the general formula (2), as "A", among the tetravalent group represented by the formula (a1) to (a7), the structure including an alicyclic ring as the formula (a4) to (a7) is preferable for being an alicyclic structure, from the viewpoint of excellent transparency and solubility. Among the above, the tetravalent group with the structure represented by the formula (a4), (a5) or (a6) including fewer bending portions is preferable from the viewpoint of excellent composite elastic modulus, among the above, the tetravalent group represented by the formula (a4) is preferable.

In the constituent unit represented by the general formula (2), "B" represents a divalent group which is a diamine residue including an aromatic ring or an alicyclic ring. Examples of "B" may include a divalent group represented by the following formula (b1) to (b6), and a divalent group wherein a part of or the all of the hydrogen atoms in the divalent group represented by these formulas is substituted with one kind or more of the substituent group selected from the group consisting of a fluoro group, a methyl group, a methoxy group, a trifluoromethyl group, and a trifluoromethoxy group.

[Chemical 6]

(b1)

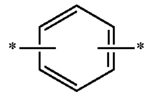

(b2)

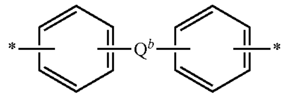

(b3)

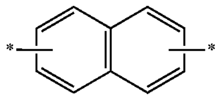

(b4)

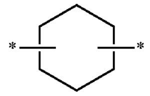

(b5)

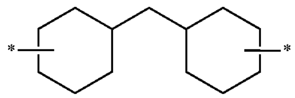

(b6)

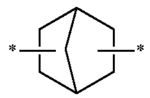

(In the formula (b1) to (b6), "*" represents a bond, $Q^b$ represents a single bond, —O—, —S—, —$CH_2$—, —CH($CH_3$)—, —$C(CH_3)_2$—, —$C(CF_3)_2$—, —CO—, —$SO_2$—, -Ph-, -Ph-$Q^{b2}$-Ph-, -$Q^{b2}$-Ph-$Q^{b2}$-, -$Q^{b2}$-Ph-Ph-$Q^{b2}$-, -$Q^{b2}$-Ph-$Q^{b2}$-Ph-$Q^{b2}$-, or a fluorene group. The "Ph" represents a fluorene group, and $Q^{b2}$ represents —O—, —S—, —$CH_2$—, —$CH(CH_3)$—, —$C(CH_3)_2$—, —$C(CF_3)_2$—, —CO—, or —$SO_2$—).

The bonding positions with respect to each ring of $Q^b$ is preferably, each independently, a meta position or a para position with respect to the amino group bonding to each ring, and the para position is more preferable. The bonding positions with respect to each ring of $Q^{b2}$ is preferably, each independently, a meta position or a para position with respect to the phenylene group, and the para position is more preferable.

In the constituent unit represented by the general formula (2), among the divalent group represented by the formula (b1) to (b6), "B" preferably includes a molecular structure having a phenylene skeleton, as well as n conjugation between the phenylenes is cut, and more preferably includes a fluorine, from the viewpoint of transparency and maintaining composite elastic modulus.

In the divalent group represented by the formula (b2), for the molecular structure wherein n conjugation between the phenylene groups is cut, $Q^b$ is preferably —O—, —S—, —$CH_2$—, —$CH(CH_3)$—, —$C(CH_3)_2$—, —$C(CF_3)_2$—, or —$SO_2$—, and further preferably —$C(CF_3)_2$—, or —$SO_2$—.

Also, from the viewpoint of maintaining transparency and composite elastic modulus, in the constituent unit represented by the general formula (2) "B" is preferably at least one kind of divalent group selected from the group consisting of the divalent group represented by the general formula (3). As the divalent group represented by the general formula (3), $R^5$ and $R^6$ are more preferably a methyl group or a trifluoromethyl group from the viewpoint of transparency, and a trifluoromethyl group is further preferable, from the viewpoint of transparency.

Also, another polyimide constituent unit different from the constituent unit represented by the formula (4) may be the constituent unit represented by the following formula (6).

[Chemical 7]

Formula (6)

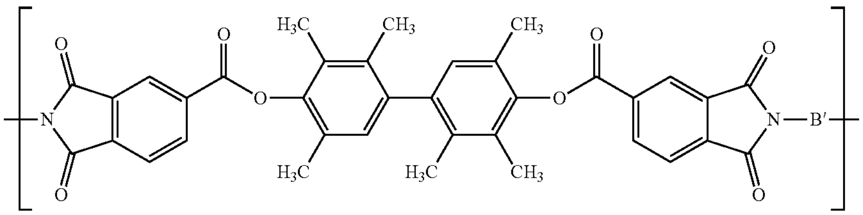

(In the formulas (6), "B'" represents a divalent group which is a diamine residue including an aromatic ring or an aliphatic ring, and is different from a 2,2-bis(trifluoromethyl)-4,4-diaminobiphenyl residue.)

In the formulas (6), "B'" represents a diamine residue including an aromatic ring or an aliphatic ring, which is different from a 2,2-bis(trifluoromethyl)-4,4-diaminobiphenyl residue, and may be the same as "B" in the general formula (5).

Among the above, when another polyimide constituent unit is included in the polyimide constituent unit, the constituent unit represented by the following formula (7), the constituent unit represented by the following formula (8), or a combination thereof is preferably included. When the constituent unit represented by the following formula (7), the constituent unit represented by the following formula (8), or a combination thereof is included, it is preferable from the viewpoint of improving transparency and improving solubility to a solvent. Among them, when the constituent unit represented by the following formula (7), is included, it is preferable from the viewpoint of improving transparency while maintaining high composite elastic modulus.

[Chemical 8]

Formula (7)

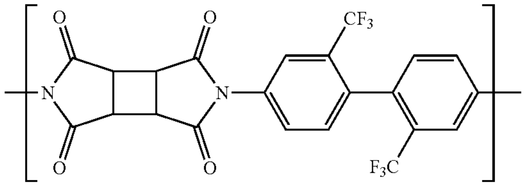

-continued

Formula (8)

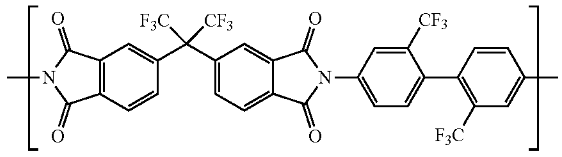

The constituent unit represented by the general formula (7) may be obtained by reacting a cyclobutane tetracarboxylic acid dianhydride and a 2,2-bis(trifluoromethyl)-4,4-diaminobiphenyl. The constituent unit represented by the general formula (8) may be obtained by reacting a 4,4'-(hexafluoroisopropylidene)diphthalic acid anhydride and a 2,2-bis(trifluoromethyl)-4,4-diaminobiphenyl.

Although the total content ratio of another polyimide constituent unit different from the constituent unit represented by the formula (4), with respect to the total of the polyimide constituent unit in the polyamideimide may be 0 mol %, when it is included, it is preferably 5 mol % or more, and may be 10 mol % or more; preferably 50 mol % or less, more preferably 40 mol % or less, and further preferably 30 mol % or less. When the total content ratio of another polyimide constituent unit is in the range, high transparency may be imparted, and composite elastic modulus is also excellent.

Among them, when the constituent unit represented by the formula (7), the constituent unit represented by the formula (8), or a combination thereof is included, the total content ratio of the constituent unit represented by the formula (7) and the constituent unit represented by the formula (8), with respect to the total of the polyimide constituent unit in the polyamideimide is preferably 5 mol % or more, and may be 10 mol % or more; preferably 50 mol % or less, more preferably 40 mol % or less, and further preferably 30 mol % or less. When the total content ratio of the constituent unit represented by the formula (7) and the constituent unit represented by the formula (8) is in the range, high transparency may be imparted, and composite elastic modulus is also excellent.

(Polyamide Constituent Unit)

The polyamide constituent unit is a constituent unit obtained by reacting a dicarboxylic acid component and a diamine component, and examples thereof may include the constituent unit represented by the following general formula (9).

[Chemical 9]

General formula 9

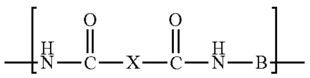

(In the general formulas (9), "X" represents a divalent group which is a dicarboxylic acid residue including an aromatic ring, and "B" represents a divalent group which is a diamine residue including an aromatic ring or an aliphatic ring.)

Here, the dicarboxylic acid residue referrers to a residue obtained by excluding two carboxyl groups from a dicarboxylic acid; and represents the same structure as a residue obtained by excluding two carboxylic acid chloride groups from a dicarboxylic acid chloride. Also, diamine residue refers to a residue obtained by excluding two amino groups from a diamine.

In the polyamide constituent unit in the polyamideimide, the constituent unit represented by the formula (5) is included as an essential component. In the polyamide constituent unit, one kind or two kinds or more of the constituent unit represented by the formula (5) is included.

The constituent unit represented by the formula (5) may be obtained by reacting a dicarboxylic acid component including an aromatic ring, and a 2,2-bis(trifluoromethyl)-4,4-diaminobiphenyl. Examples of the dicarboxylic component may include dicarboxylic acid and dicarboxylic acid chloride, and from the viewpoint of reactivity, dicarboxylic acid chloride is preferably used.

In the constituent unit represented by the formula (5), "X" in the formula (5) is preferably at least one selected from the group consisting of the structures represented by the following formula (x1) to (x3). Thereby, a resin layer having high composite elastic modulus while having sufficient transparency may be obtained. Also, not only 1,4-phenylene group represented by the following formula (x), but may be 1,3-phenylene group.

[Chemical 10]

Formula (x1)

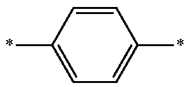

Formula (x2)

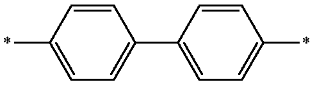

Formula (x3)

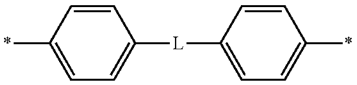

(In the formula (x3), "L" represents —O—, —S—, $—CH_2—$, $—CH(CH_3)—$, $—C(CH_3)_2—$, $—C(CF_3)_2—$, or —CO—, and "*" represents a bond.)

From the viewpoint of high composite elastic modulus and improving bending resistance, among the structure represented by the formulas (x1) to (x3), "X" in the formula (5) is preferably the structure represented by the formula (x1) or formula (x2), and the structure represented by the formula (x2) is more preferable.

The content ratio of the constituent unit represented by the formula (5), with respect to the total of the polyamide constituent unit in the polyamideimide may be 100 mol %. Also, in the polyamide constituent unit, another polyamide constituent unit different from the constituent unit represented by the formula (5) may be included. The content ratio of the constituent unit represented by the formula (5), with respect to the total of the polyamide constituent unit in the polyamideimide is preferably 80 mol % or more, more preferably 85 mol % or more, and further preferably 90 mol % or more; preferably 100 mol % or less, and may be 95 mol % or less. When the content ratio of the constituent unit represented by the formula (5) is in the above range, the balance between transparency and composite elastic modulus is excellent.

From the balance between transparency and composite elastic modulus, the total content ratio of those "X" in the formula (5) is one kind or more selected from the group consisting of the structure represented by the formulas (x1) to (x3), with respect to the total of the constituent unit represented by the formula (5) in the polyamideimide may be 100 mol %, preferably 80 mol % or more and 100 mol % or less, more preferably 90 mol % or more and 100 mol % or less, and further preferably 95 mol % or more and 100 mol % or less.

In the polyamide constituent unit, another polyamide constituent unit different from the constituent unit represented by the formula (5) may be included. Examples thereof may include, among the constituent unit represented by the general formula (9), the polyamide constituent unit different from the constituent unit represented by the formula (5). In the constituent unit represented by the general formula (9), "X" and "B" may be the same, and may be different in each constituent unit. That is, in the constituent unit represented by the general formula (9), one kind or two kinds or more of "X" and "B" may be included, each independently. In the general formula (9), "X" may be the same as "X" in the constituent unit represented by the formula (5), and "B" may be the same as "B" in the constituent unit represented by the formula (5).

As for another polyamide constituent unit different from the constituent unit represented by the formula (5) which may be included in the polyamide constituent unit, from the viewpoint of transparency, in the constituent unit represented by the general formula (9), "X" is preferably at least one selected from the group consisting of the structures represented by the formula (x1) to (x3), and "B" is preferably one wherein $Q^b$ in the divalent group represented by the formula (b2) is —O—, —S—, $—CH_2—$, $—CH(CH_3)—$, $—C(CH_3)_2—$, $—C(CF_3)_2—$, or $—SO_2—$, or one wherein $R^5$ and $R^6$ in the divalent group represented by the general formula (3) is a hydrogen atom or a methyl group; more preferably one wherein $Q^b$ in the divalent group represented by the formula (b2) is $—C(CF_3)_2—$, or $—SO_2—$, or one wherein $R^5$ and $R^6$ in the divalent group represented by the general formula (3) is a methyl group; and further preferably one wherein $Q^b$ in the divalent group represented by the formula (b2) is $—C(CF_3)_2—$.

(Polyamideimide)

The content ratio of the polyamide constituent unit including the constituent unit represented by the formula (5), with respect to the total of the polyamide constituent unit including the constituent unit represented by the formula (4) and the polyamide constituent unit including the constituent unit represented by the formula (5) is preferably 10 mol % or more, more preferably 30 mol % or more, further preferably 40 mol % or more, and further more preferably 50 mol % or more; preferably 80 mol % or less, more preferably 70 mol % or less, and further preferably 60 mol % or less. When the content ratio of the polyamide constituent unit including the constituent unit represented by the formula (5) is in the range, composite elastic modulus and bending resistance at room temperature of the resin layer are easily improved, also, solubility to a solvent and bending resistance under high temperature and high humidity of the polyamideimide are likely to be excellent.

The content ratio of the dicarboxylic acid residue “X” including an aromatic ring in the formula (5), with respect to the total the tetracarboxylic acid residue and the dicarboxylic acid residue in the polyamideimide resin is preferably 10 mol % or more, more preferably 30 mol % or more, further preferably 40 mol % or more, and further more preferably 50 mol % or more; preferably 80 mol % or less, more preferably 70 mol % or less, and further preferably 60 mol % or less. When the content ratio of the dicarboxylic acid residue “X” including an aromatic ring in the formula (5) is in the range, composite elastic modulus and bending resistance at room temperature of the resin layer are easily improved, also, solubility to a solvent and bending resistance under high temperature and high humidity of the polyamideimide are likely to be excellent.

Also, in a part thereof, the polyamideimide may include a structure different from the polyimide constituent unit and the polyamide constituent unit. In the polyamideimide, the total of the polyimide constituent unit including the constituent unit represented by the formula (4) and the polyamide constituent unit including the constituent unit represented by the formula (5) is preferably 95% or more, more preferably 98% or more, and further preferably 100%, of all the constituent units in the polyamideimide.

Examples of the structure different from the polyimide constituent unit and the polyamide constituent unit may include a constituent unit wherein the tetracarboxylic acid component is not completely imidized so as to include a polyamide acid structure in a part thereof, and a polyamideimide constituent unit including a tricarboxylic acid residue such as a trimellitic acid anhydride.

Each constituent unit and the content ratio (mol %) of each residue in the polyamideimide may be measured using a 1H-NMR, and may also be determined from the charged ratio of the raw material when the polyamideimide is produced. Also, the structure of the polyamideimide may be determined by using for example, NMR, and various types of mass spectrometry. Also, the structure and content ratio of each residue in the polyamideimide may be determined, for example, by decomposing the polyamideimide by an alkaline aqueous solution or supercritical methanol, and analyzing the obtained decomposed product by using high-speed liquid chromatography, gas chromatograph-mass spectrometer, NMR, elemental analysis, XPS/ESCA, and TOF-SIMS.

The weight average molecular weight of the polyamideimide is preferably 50,000 or more, more preferably 100,000 or more, and further preferably 150,000 or more; preferably 1,000,000 or less, more preferably 500,000 or less, and further preferably 300,000 or less. When the weight average molecular weight of the polyamideimide resin is in the range, defects in appearance such as a crack and whitening hardly occur after firing, it is easy to obtain a resin layer having good transparency, and an increase in viscosity during synthesis, varnish preparation, and resin layer formation may be suppressed, and the resin layer is easily formed.

The method for measuring the weight average molecular weight of the polyamideimide may be the same as the method for measuring the weight average molecular weight of the polyimide.

(b) Ultraviolet Absorber

The resin layer may include an ultraviolet absorber. Deterioration of the resin layer due to ultraviolet rays may be suppressed. In particular, when the resin layer includes polyimide, color change over time of the resin layer including polyimide may be suppressed. Also, in display device including a member for a display device, the deterioration of a member placed on the display panel side than the member for a display device, such as a polarizer, due to ultraviolet ray may be suppressed.

Examples of the ultraviolet absorber included in the resin layer may include triazine based ultraviolet absorbers; benzophenone based ultraviolet absorbers such as hydroxybenzophenone based ultraviolet absorbers; and benzotriazole based ultraviolet absorbers.

Specific examples of the triazine based ultraviolet absorber; the benzophenone based ultraviolet absorber such as a hydroxybenzophenone based ultraviolet absorber; and the benzotriazole based ultraviolet absorber may include those described in, for example, JP-A No. 2019-132930.

Among them, as the ultraviolet absorber, a triazine based ultraviolet absorber, a hydroxybenzophenone based ultraviolet absorber, and a benzotriazole based ultraviolet absorber are preferably used.

Also, the ultraviolet absorber is preferably a polymer or an oligomer. This is because a bleed-out of the ultraviolet absorber when the member for a display device is repeatedly bent, may be suppressed. Examples of such ultraviolet absorbers may include polymers or oligomers having a triazine skeleton, a benzophenone skeleton, or a benzotriazole skeleton, and specifically, one obtained by thermally copolymerizing (meth)acrylate having a benzotriazole skeleton or a benzophenone skeleton and methyl methacrylate (MMA) at an arbitrary ratio, is preferable.

The content of the ultraviolet absorber in the resin layer is not particularly limited, and is preferably, for example, 1% by mass or more and 6% by mass or less, and more preferably 2% by mass or more and 5% by mass or less. When the content of the ultraviolet absorber is too low, the effect of the ultraviolet absorber may not be sufficiently obtained. Also, when the content of the ultraviolet absorber is too high, the resin layer may be significantly colored, or the strength of the resin layer may be decreased.

(c) Other Additives

The resin layer may further include an additive, if necessary. Examples of the additive may include inorganic particles, a silica filler configured to facilitate winding, a surfactant configured to improve film formability and defoaming property, and an adhesion improver.

(4) Method for Forming Resin Layer

Examples of a method for forming the resin layer may include a method wherein a glass substrate is coated with a resin composition. The coating method is not particularly limited as long as it is a method capable of coating in a desired thickness; and examples thereof may include general coating methods such as a gravure coating method, a gravure reverse coating method, a gravure offset coating method, a spin coating method, a roll coating method, a reverse roll method, a blade coating method, a dip coating method, and a screen printing method. Also, a transfer method may also be used as a method for forming the resin layer.

Hereinafter, a case where the resin layer includes polyimide or polyamideimide will be described as examples.

(i) Method for Forming Resin Layer Including Polyimide

Examples of the method for forming a resin layer including polyimide may include a method wherein a glass substrate is coated with a polyimide varnish including polyimide and an organic solvent and dried; and a method wherein, after a glass substrate is coated with a polyimide precursor composition including a polyimide precursor (polyamide acid) and an organic solvent, the polyimide precursor is imidized by heat treatment or chemical treatment. In the former method, the heating conditions of the film forming process may be relieved. Meanwhile, in the latter method, since there is no restriction in the solubility of the polyimide, the choice of the chemical structure of the polyimide may be increased.

Among them, examples of a preferable method for producing may include the following method, from the viewpoint of resistance to a blow hole, and an ease of obtaining a resin layer having good thickness uniformity.

A method for forming a resin layer including polyimide preferably includes a preparing step of preparing a polyimide varnish including polyimide and an organic solvent, wherein a content ratio of the polyimide is 6% by mass or more and 15% by mass or less in the polyimide varnish and a viscosity at 25° C. is 1,000 cps or more and 50,000 cps or less; a coating step of coating a glass substrate with the polyimide varnish; a first drying step of drying the coating film at a temperature of 140° C. or less; and a second drying step of heating the post-drying coating film at a temperature of 200° C. or more.

When the polyimide is well dissolved into the organic solvent, since the heating conditions of the film forming process may be relieved, it is preferable to form a resin layer using a polyimide varnish wherein the polyimide is dissolved in the organic solvent. When the polyimide includes the specific amount or more of a constituent unit including a tetracarboxylic acid residue of the specific structure including a parabiphenylene group wherein two ester bond-mediated face angles are twisted, in the main chain thereof, the polyimide is easily dissolved in an organic solvent. When the polyimide has a solvent solubility such that the polyimide is dissolved into an organic solvent at 25° C. by 6% by mass or more, the method for forming a resin layer described above may be preferably used.

According to the method for forming a resin layer, the polyimide content ratio in the varnish may be increased to a sufficient concentration, and the varnish may be adjusted to a desired viscosity range, so that it is possible to obtain a resin layer which is resistant to a blow hole, and has good thickness uniformity.

The organic solvent is not particularly limited as long as polyimide may be dissolved, and for example, an aprotic polar solvent or a water-soluble alcohol based solvent may be used. Among them, an organic solvent including a nitrogen atom such as N-methyl-2-pyrrolidone, N,N-dimethylformamide, N,N-dimethylacetamide, dimethylsulfoxide, hexamethylphosphoramide, and 1,3-dimethyl-2-imidazolidinone; and γ-butyrolactone are preferably used. Also, one kind of the organic solvent may be used alone, or two kinds or more may be used as a mixed solvent.

As a method for forming the resin layer including polyimide described above, the method described in, for example, JP-A No. 2019-1989 and JP-A No. 2019-182974 may be referred to.

(ii) Method for Forming Resin Layer Including Polyamideimide

A method of forming a resin layer including polyamideimide is not particularly limited, and examples thereof may include a method wherein a glass substrate is coated with a polyamideimide varnish including polyamideimide and an organic solvent, and dried.

Method for producing polyamideimide is not particularly limited, for example, it may be produced via the following steps: a step of obtaining a polyimide precursor (polyamide acid) by reacting one kind or two kinds or more tetracarboxylic acid dianhydride including a tetracarboxylic acid dianhydride represented by the formula (4-1) and, if necessary, a tetracarboxylic acid dianhydride including an aromatic ring or an alicyclic ring, with one kind or two kinds or more diamine including 2,2-bis(trifluoromethyl)-4,4-diaminobiphenyl and, if necessary, a diamine including an aromatic ring or an alicyclic ring; a step of obtaining a polyamide-polyimide precursor (polyamide acid) copolymer by reacting the obtained polyimide precursor (polyamide acid) with a dicarboxylic component including an aromatic ring; and a step of imidizing the obtained polyamide-polyimide precursor (polyamide acid) copolymer.

The organic solvent included in the polyamideimide varnish may be the same as the organic solvent included in the polyimide varnish described above.

The method for applying the polyamideimide varnish is not particularly limited as long as it may be applied with a desired thickness, and examples thereof may include a general coating method such as a gravure coating method, a gravure reverse coating method, a gravure offset coating method, a spin coating method, a roll coating method, a reverse roll coating method, a blade coating method, a dip coating method, and a screen printing method. Also, a transfer method may also be used as a method for forming a coating film of the polyamideimide varnish.

After the application of the polyamideimide varnish, the solvent in the coating film is dried, for example, at a temperature of 150° C. or less, preferably at a temperature of 30° C. or more and 120° C. or less, until the coating film becomes tack-free.

The drying time may be appropriately adjusted according to, for example, the thickness of the coating film, the type of solvent, and the drying temperature, and is preferably, for example, 5 minutes or more and 60 minutes or less, and preferably 10 minutes or more and 40 minutes or less. When the drying time is too long, the efficiency of forming the resin layer may be decreased. Meanwhile, when the drying time is too short, rapid drying of the solvent may affect the appearance or the like of the obtained resin layer.

The method for drying the solvent is not particularly limited as long as the solvent may be dried at the temperature described above, and for example, an oven, a drying furnace, a hot plate, or infrared heating may be used.

The drying step may include a first drying step of drying the coating film, and a second drying step of heating the post-drying coating film at high temperature. The heating temperature in the second drying step is preferably, for example, 150° C. or more. From the viewpoint of bending resistance, the residual solvent in the resin layer is preferably removed as much as possible.

2. Glass Substrate

The glass substrate in the present disclosure has a thickness of 100 μm or less, and is a member configured to support the resin layer.

The glass constituting the glass substrate is not particularly limited, and is preferably a chemically strengthened glass. The chemically strengthened glass is preferable since it has excellent mechanical strength and may be made thin accordingly. The chemically strengthened glass is typically a glass wherein mechanical properties are strengthened by a chemical method by partially exchanging ionic species, such as by replacing sodium with potassium, in the vicinity of the surface of the glass, and includes a compressive stress layer on the surface.

Examples of the glass constituting the chemically strengthened glass substrate may include aluminosilicate glass, soda-lime glass, borosilicate glass, lead glass, alkali barium glass, and aluminoborosilicate glass.

Examples of the commercial products of the chemically strengthened glass substrate may include Gorilla Glass from Corning Incorporated, and Dragontrail from AGC Inc. Also, as the chemically strengthened glass substrate, those disclosed in, for example, JP-A No. 2019-194143 may be used.

The thickness of the glass substrate is 100 μm or less, preferably 15 μm or more and 100 μm or less, more preferably 20 μm or more and 90 μm or less, and further preferably 25 μm or more and 80 μm or less. By the thickness of the glass substrate being thin as in the above range, excellent flexibility may be obtained, and at the same time, sufficient hardness may be obtained. It is also possible to suppress curling of the member for a display device. Furthermore, it is preferable in terms of reducing the weight of the member for a display device.

3. Functional Layer

The member for a display device in the present disclosure may further include a functional layer on the resin layer, on an opposite surface side to the glass substrate. Examples of the functional layer may include a hard coating layer, a protecting layer, an antireflection layer, and an antiglare layer.

Also, the functional layer may be a single layer, and may include a plurality of layers. Also, the functional layer may be a layer having a single function, and may include a plurality of layers having functions different from each other. For example, the member for a display device in the present disclosure may include a hard coating layer and a protecting layer, in this order from the resin layer side, as the functional layers.

(1) Hard Coating Layer

Figure 2:
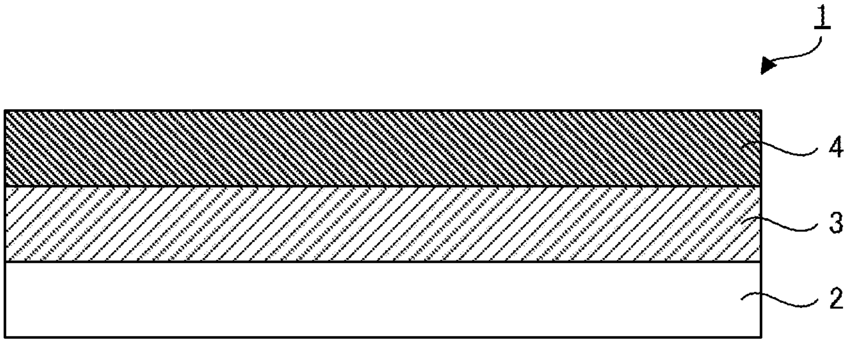
FIG. 2 is a schematic cross-sectional view illustrating an example of the member for a display device in the present disclosure.

For example, as shown in FIG. 2, the member for a display device in the present disclosure preferably further includes hard coating layer 4 on the resin layer 3, on an opposite surface side to the glass substrate 2. The hard coating layer is a member configured to increase the surface hardness. By placing the hard coating layer, scratch resistance may be improved.

(a) Properties of Hard Coating Layer

Here, "hard coating layer" is a member configured to increase the surface hardness. Specifically, in a configuration wherein the member for a display device in the present disclosure includes a hard coating layer, "hard coating layer" is referred to one having a hardness of "H" or more in the pencil hardness test according to JIS K 5600-5-4 (1999).

When the member for a display device in the present disclosure includes the hard coating layer on the resin layer, on an opposite surface side to the glass substrate, the pencil hardness of the hard coating layer side surface of the member for a display device is preferably H or more, more preferably 2H or more, and further preferably 3H or more.

Here, the pencil hardness is measured by the pencil hardness test according to JIS K5600-5-4 (1999). Specifically, using a pencil for the test according to JIS-S-6006, the pencil hardness test according to JIS K5600-5-4 (1999) is carried out to the hard coating layer side surface of the member for a display device, and the pencil hardness may be determined by evaluating the highest pencil hardness at which the sample is not bruised. The measurement conditions may be angle of 45°, load of 750 g, testing rate of 0.5 mm/sec or more and 1 mm/sec or less, and temperature of 23±2° C. As the pencil hardness tester, for example, a pencil scratch hardness tester from Toyo Seiki Seisaku-sho, Ltd. may be used.

(b) Configuration of Hard Coating Layer

The hard coating layer may be a single layer, and may have a multi-layered structure of two layers or more. When the hard coating layer has the multi-layered structure, in order to improve the surface hardness, and also to improve the balance of bending resistance and elastic modulus, the hard coating layer preferably includes a layer configured to satisfy the pencil hardness and a layer configured to satisfy the dynamic bending test (a layer configured to satisfy the scratch resistance).

(c) Material of Hard Coating Layer

As a material of the hard coating layer, for example, an organic material, an inorganic material, and an organic-inorganic composite material may be used.

Among the above, the material of the hard coating layer is preferably an organic material. Specifically, the hard coating layer preferably include a cured product of a resin composition including a polymerizable compound. The cured product of a resin composition including a polymerizable compound may be obtained by carrying out a polymerization reaction of a polymerizable compound, by a known method using a polymerization initiator if necessary.

(i) Polymerizable Compound

The polymerizable compound includes at least one polymerizable functional group in the molecule. As the polymerizable compound, for example, at least one kind of radical polymerizable compound and cation polymerizable compound may be used.

The radical polymerizable compound is a compound including a radical polymerizable group. The radical polymerizable group included in the radical polymerizable compound may be any functional group capable of generating a radical polymerization reaction, and is not particularly limited; and examples thereof may include a group including a carbon-carbon unsaturated double bond, and specific examples thereof may include a vinyl group and a (meth) acryloyl group. Incidentally, when the radical polymerizable compound includes two or more radical polymerizable groups, these radical polymerizable groups may be the same, and may be different from each other.

The number of radical polymerizable groups included in one molecule of the radical polymerizable compound is preferably two or more, and more preferably three or more, from the viewpoint of improving hardness of the hard coating layer.

Among the above, from the viewpoint of high reactivity, the radical polymerizable compound is preferably a compound including a (meth) acryloyl group. For example, a polyfunctional (meth) acrylate monomer and oligomer having a molecular weight of several hundred to several thousand, and including several (meth) acryloyl groups in the molecule may be preferably used; such as those referred to as urethane (meth)acrylate, polyester (meth)acrylate, epoxy (meth)acrylate, melamine (meth)acrylate, polyfluoroalkyl (meth)acrylate, and silicone (meth)acrylate; and a polyfunctional (meth) acrylate polymer including two or more (meth) acryloyl groups on the side chain of an acrylate polymer may also be preferably used. Among the above, a polyfunctional (meth) acrylate monomer including two or more (meth) acryloyl groups in one molecule may be preferably used. By the hard coating layer including a cured product of the polyfunctional (meth) acrylate monomer, the hardness of the hard coating layer may be increased, and the close adhesiveness may further be improved. Also, a polyfunctional (meth) acrylate oligomer or polymer including two or more (meth) acryloyl groups in one molecule may also be preferably used. By the hard coating layer including a cured product of the polyfunctional (meth) acrylate oligomer or polymer, hardness and bending resistance of the hard coating layer may be improved, and close adhesiveness may further be improved.

Incidentally, in the present specification, (meth) acryloyl represents each of acryloyl and methacryloyl, and (meth) acrylate represents each of acrylate and methacrylate.

Specific examples of the polyfunctional (meth)acrylate monomer may include those described in, for example, JP-A No. 2019-132930. Among them, those having 3 or more and 6 or less (meth)acryloyl groups in one molecule are preferable from the viewpoint of high reactivity and improving hardness of the hard coating layer, and from the point of close adhesiveness. As such a polyfunctional (meth)acrylate monomer, for example, pentaerythritol triacrylate (PETA), dipentaerythritol hexaacrylate (DPHA), pentaerythritol tetraacrylate (PETTA), dipentaerythritol pentaacrylate (DPPA), trimethylolpropane tri(meth)acrylate, tripentaerythritol octa(meth)acrylate, and tetrapentaerythritol deca (meth)acrylate may be preferably used. In particular, at least one kind selected from pentaerythritol tri(meth)acrylate, dipentaerythritol penta(meth)acrylate, and dipentaerythritol hexaacrylate; and PO, EO or caprolactone modified product thereof is preferable.

In order to adjust hardness or viscosity, or to improve close adhesiveness, the resin composition may include a monofunctional (meth) acrylate monomer as the radical polymerizable compound. Specific examples of the monofunctional (meth) acrylate monomer may include those described in, for example, JP-A No. 2019-132930.

The cation polymerizable compound is a compound including a cation polymerizable group. The cation polymerizable group included in the cation polymerizable compound may be a functional group capable of generating a cation polymerization reaction, and is not particularly limited; and examples thereof may include an epoxy group, an oxetanyl group, and a vinyl ether group. Incidentally, when the cation polymerizable compound includes two or more cation polymerizable groups, these cation polymerizable groups may be the same, and may be different from each other.

The number of the cation polymerizable groups included in one molecule of the cation polymerizable compound is preferably two or more, and more preferably three or more, from the viewpoint of improving hardness of the hard coating layer.

Also, among the above, as a cation polymerizable compound, a compound including at least one kind of an epoxy group and an oxetanyl group as a cation polymerizable group is preferable, and a compound including two or more of at least one kind of an epoxy groups and an oxetanyl groups in one molecule is more preferable. A cyclic ether group such as an epoxy group and an oxetanyl group is preferable from the viewpoint that shrinkage associated with the polymerization reaction is small. Also, a compound including the epoxy group among the cyclic ether groups has advantages in that compounds having various structure may be easily obtained; the durability of the obtained hard coating layer is not adversely affected; and the compatibility with the radical polymerizable compound may be easily controlled. Also, the oxetanyl group among the cyclic ether groups has advantages in that the degree of polymerization is high compared with the epoxy group; the toxicity is low; and when the obtained hard coating layer is combined with a compound including an epoxy group, the network forming rate obtained from the cationic polymerizable compound in the coating film is accelerated, and an independent network is formed without leaving unreacted monomers in the film even in a region mixed with the radical polymerizable compound.

Examples of the cationic polymerizable compound including an epoxy group may include an alicyclic epoxy resins such as polyglycidyl ether of a polyhydric alcohol including an alicyclic ring, or resins obtained by epoxidizing a compound including a cyclohexene ring or a cyclopentene ring, with a suitable oxidizing agent such as hydrogen peroxide and a peracid; an aliphatic epoxy resins such as polyglycidyl ether of aliphatic polyhydric alcohol or alkylene oxide adduct thereof, polyglycidyl ester of aliphatic long-chain polybasic acid, or homopolymer or copolymer of glycidyl (meth)acrylate; a glycidyl ether type epoxy resin such as glycidyl ether produced by the reaction of bisphenols such as bisphenol A, bisphenol F, and hydrogenated bisphenol A, or derivative thereof such as alkylene oxide adduct and caprolactone adduct with epichlorohydrin, and resins that is novolac epoxy resin and derived from bisphenols.

Specific examples of the cationic polymerizable compound including the alicyclic epoxy resin, the glycidyl ether type epoxy resin, and an oxetanyl group may include those described in, for example, JP-A No. 2018-104682.

Incidentally, the cured product of the resin composition including the polymerizable compound included in the hard coating layer may be analyzed by, for example, a Fourier transform infrared spectroscopy (FTIR) and a pyrolysis gas chromatography mass spectrometry (GC-MS), and the degradant of the polymer may be analyzed using a combination of, for example, a high-speed liquid chromatography, a gas chromatography mass spectrometry, a NMR, an element analyzer, an XPS/ESCA and a TOF-SIMS.

(ii) Polymerization Initiator

The resin composition may include a polymerization initiator if necessary. The polymerization initiator may be used by appropriately selecting from, for example, a radical polymerization initiator, a cation polymerization initiator, and a radical and cation polymerization initiator. These polymerization initiators are decomposed by at least one kind of light irradiation and heating to generate radicals or cations to cause radical polymerization and cation polymerization to proceed. Incidentally, all of the polymerization initiator may be decomposed and may not be left in the hard coating layer, in some cases.

Specific examples of the radical polymerization initiator, and the cation polymerization initiator may include those described in, for example, JP-A No. 2018-104682.

(iii) Particles

The hard coating layer preferably includes inorganic or organic particles, and more preferably includes inorganic particles. By the hard coating layer including the particles, hardness may be improved.

Examples of the inorganic particle may include metal oxide particles such as silica ($SiO_2$), aluminum oxide, zirconia, titania, zinc oxide, germanium oxide, indium oxide, tin oxide, indium tin oxide (ITO), antimony oxide, and cerium oxide; metal fluoride particles such as magnesium fluoride and sodium fluoride; metal particles; metal sulfide particles; and metal nitride particles. Among them, metal oxide particles are preferable, at least one kind selected from silica particles and aluminum oxide particles are more preferable, and silica particles are further preferable. The reason therefor is to obtain excellent hardness.

Also, the inorganic particles are preferably reactive inorganic particles including a reactive functional group reactive functional group which undergoes a cross-linking reaction between the inorganic particles or with at least one kind of the polymerizable compound, and has an optical reactivity capable of forming a covalent bond on at least a part of the inorganic particle surface. By undergoing the cross-linking reaction between the reactive inorganic particles or between the reactive inorganic particle and at least one kind of the radical polymerizable compound and the cation polymerizable compound, hardness of the hard coating layer may further be improved.

At least a part of the surface of the reactive inorganic particles are covered with an organic component, and include the reactive function group introduced by the organic component, on the surface thereof. As the reactive functional group, for example, a polymerizable unsaturated group is preferably used, and preferably a photo curing unsaturated group. Examples of the reactive functional group inorganic particles may include ethylenically unsaturated bonds such as a (meth) acryloyl group, a vinyl group, and an allyl group; and an epoxy group.

The reactive silica particle is not particularly limited, and conventionally known ones may be used, and examples thereof may include reactive silica particles described in, for example, JP-A No. 2008-165040. Also, examples of commercially available products of the reactive silica particle may include MIBK-SD, MIBK-SDMS, MIBK-SDL, MIBK-SDZL, all from Nissan Chemical Industry Co., Ltd.; and V8802 and V8803, all from JGC Catalysts and Chemicals Ltd.

Also, although the silica particle may be a spherical silica particle, the silica particle is preferably a deformed silica particle. The spherical silica particle and the deformed silica particle may be mixed. Incidentally, in the present specification, the term deformed silica particle means a silica particle of a shape having random irregularities of potato-like shape on the surface. Since the deformed silica particle has a larger surface area compared with the spherical silica particle, by including such deformed silica particle, the contact area with the resin component, for example, becomes large, so that the hardness of the hard coating layer may be improved.

Incidentally, whether the silica particle is the deformed silica particle, or not may be confirmed by observing the cross-section of the hard coating layer with an electron microscope.

From the viewpoint of improving hardness, the average particle size of the inorganic particle is preferably 5 nm or more, and more preferably 10 nm or more. When the average particle size of the inorganic particle is too small, the production of the particle is difficult, and the particles may be easily aggregated. Also, from the viewpoint of transparency, the average particle size of the inorganic particle is preferably 200 nm or less, more preferably 100 nm or less, and further preferably 50 nm or less. When the average particle size of the inorganic particle is too large, large irregularities may be formed on the hard coating layer, and the haze may be increased.

Here, the average particle size of the inorganic particles may be measured by observing the cross-section of the hard coating layer with an electron microscope, and the average particle size of arbitrary selected 10 particles is regarded as the average particle size. Incidentally, the average particle size of deformed silica particles is the average value of the maximum value (major axis) and the minimum value (minor axis) of the distances between two points of the outer periphery of the deformed silica particle came up in the cross-sectional microscope observation of the hard coating layer.

The hardness of the hard coating layer may be controlled by adjusting the size and content of the inorganic particles. For example, the content of the silica particles is preferably 25 parts by mass or more and 60 parts by mass or less, with respect to 100 parts by mass of the polymerizable compound.

(iv) Ultraviolet Absorber

The hard coating layer may include an ultraviolet absorber. Deterioration of the resin layer due to ultraviolet rays may be suppressed. In particular, when the resin layer includes polyimide, color change over time of the resin layer including polyimide may be suppressed. Also, in display device including a member for a display device, the deterioration of a member placed on the display panel side than the member for a display device, such as a polarizer, due to ultraviolet ray may be suppressed.

Among them, the peak of the absorption wavelength, in absorbance measurement, of the ultraviolet absorber included in the hard coating layer preferably exist in 300 nm or more and 390 nm or less, more preferably 320 nm or more and 370 nm or less, and further preferably 330 nm or more and 370 nm or less. Such an ultraviolet absorber is able to absorb ultraviolet ray in UVA range efficiently, meanwhile, by shifting the peak wavelength from the absorption wavelength of 250 nm of the initiator for curing the hard coating layer, a hard coating layer having an ultraviolet absorbing ability may be formed without inhibiting the curing of the hard coating layer.

Among them, from the viewpoint of preventing the coloring due to the ultraviolet absorber, the peak of the absorption wavelength of the ultraviolet absorber is preferably 380 nm or less.

Incidentally, the absorption of the ultraviolet absorber may be measured using, for example, an ultraviolet-visible-near infrared spectrophotometer (such as V-7100 from JASCO Corporation).

The ultraviolet absorber may be similar to the ultraviolet absorber used in the resin layer.

Among them, from the viewpoint of suppressing the deterioration of the resin layer due to ultraviolet ray, one kind or more of the ultraviolet absorber selected from the group consisting of a hydroxybenzophenone based ultraviolet absorber and a benzotriazole based ultraviolet absorber is preferable, and one kind or more of the ultraviolet absorber selected from the group consisting of a hydroxybenzophenone based ultraviolet absorber is more preferable.

Specific examples of the hydroxybenzophenone based ultraviolet absorber may include those described in, for example, JP-A No. 2019-132930.

Among the hydroxybenzophenone based ultraviolet absorber, 2-hydroxybenzophenone based ultraviolet absorber is preferable, one kind or more selected from the group consisting of a benzophenone based ultraviolet absorber having the following general formula (A) is more preferable. The deterioration of the resin layer due to ultraviolet ray may be suppressed, and durability may be improved.

[Chemical 11]

General formula (A)

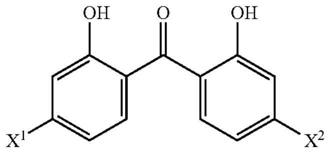

(In the general formula (A), $X^1$ and $X^2$ each independently represents a hydroxyl group, —$OR^a$, or a 1-15C hydrocarbon group; Ra represents a 1-15C hydrocarbon group.)

In the general formula (A), examples of the 1-15C hydrocarbon group in $X^1$, $X^2$, and Ra may include a methyl group, an ethyl group, a propyl group, a butyl group, a pentyl group, a hexyl group, a heptyl group, an octyl group, a dodecyl group, an allyl group, and a benzyl group. The 3C or more aliphatic hydrocarbon group may be a straight chain, or a branched respectively. The hydrocarbon group is preferably 1-12C, and more preferably 1-8C. From the viewpoint of easily improved transparency, the hydrocarbon group is preferably an aliphatic hydrocarbon group, among them, preferably a methyl group or an allyl group.

From the viewpoint of improving the durability, $X^1$ and $X^2$ each independently is preferably a hydroxyl group, or —$OR^a$.

Among them, one kind or more selected from the group consisting of the benzophenone based ultraviolet absorber having the general formula (A) is preferably one kind or more selected from the group consisting of 2,2',4,4'-tetrahydroxy benzophenone, 2,2'-dihydroxy4,4'-dimethoxybenzophenone, and 2,2'-dihydroxy-4,4'-diallyloxybenzophenone; more preferably one kind or more selected from the group consisting of 2,2',4,4'-tetrahydroxy benzophenone, and 2,2'-dihydroxy-4,4'-dimethoxybenzophenone.

Specific examples of the benzotriazole based ultraviolet absorber may include those described in, for example, JP-A No. 2019-132930.

Among them, the benzotriazole based ultraviolet absorber is preferably 2-(2-hydroxyphenyl) benzotriazoles, and more preferably one kind or more selected from the group consisting of the benzotriazole based ultraviolet absorber having the following general formula (B). The reason therefor is to suppress the deterioration of the resin layer due to ultraviolet ray, and to improve the durability.

[Chemical 12]

General formula (B)

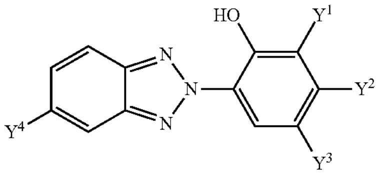

(In the general formula (B), $Y^1$, $Y^2$, and $X^3$ each independently represents a hydrogen atom, a hydroxyl group, or —$OR^b$, or a 1-15C hydrocarbon group; $R^b$ represents a 1-15C hydrocarbon group; at least one of $Y^1$, $Y^2$, and $Y^3$ represents a hydroxyl group, or —$OR^b$, or a 1-15C hydrocarbon group; and $Y^4$ represents a hydrogen atom, or a halogen atom.)

In the general formula (B), examples of the 1-15C hydrocarbon group in $Y^1$, $Y^2$, $Y^3$ and $R^b$ may include a methyl group, an ethyl group, a propyl group, a butyl group, a pentyl group, a hexyl group, a heptyl group, an octyl group, and a dodecyl group. The 3C or more aliphatic hydrocarbon group may be a straight chain, or a branched respectively. The hydrocarbon group is preferably 1-12C, and more preferably 1-8C. From the viewpoint of easily improved transparency, the hydrocarbon group is preferably an aliphatic hydrocarbon group, preferably a straight chain, or a branched alkyl group; among them, preferably a methyl group, t-butyl group, t-pentyl group, n-octyl group, or t-octyl group.

In the general formula (B), examples of the halogen atom in $Y^4$ may include a chlorine atom, a fluorine atom, and a bromine atom, among them, a chlorine atom is preferable.

Among them, in the general formula (B), $Y^1$ and $Y^3$ preferably represent a hydrogen atom, and $Y^2$ preferably represents a hydroxy group, or —$OR^b$; and more preferably one kind or more selected from the group consisting of 2-(2-hydroxy-4-octyloxyphenyl)-2H-benzotriazole, and 2-(2,4-dihydroxyphenyl)-2H-benzotriazole. The reason therefor is to suppress the deterioration of the resin layer due to ultraviolet ray, and to improve durability.

From the viewpoint of suppressing the haze due to the mixing of the ultraviolet absorber, the content of the ultraviolet absorber in the hard coating layer is preferably, for example, 10% by mass or less, and more preferably 7% by mass or less. Also, from the viewpoint of suppressing the deterioration of the resin layer due to ultraviolet ray and improving the durability, the content of the ultraviolet absorber in the hard coating layer is preferably 1% by mass or more and 6% by mass or less, and more preferably 2% by mass or more and 5% by mass or less.

(v) Antifoulant

The hard coating layer may include an antifoulant. The member for a display device may be imparted with an antifouling property.

The antifoulant is not particularly limited, and examples thereof may include a silicone based antifoulant, a fluorine based antifoulant, and a silicone based-fluorine based antifoulant. Also, the antifoulant may be an acrylic based antifoulant. One kind of the antifoulant may be used alone, and two kinds or more may be used as a mixture.

A fingerprint is not likely to be marked (inconspicuous) on the hard coating layer including a silicone based antifoulant or a fluorine based antifoulant, and is easily wiped off. Also, when the silicone based antifoulant or the fluorine based antifoulant is included, since the surface tension when applying a curable resin composition for a hard coating layer may be decreased, leveling property is excellent, so that the appearance of the obtained hard coating layer will be excellent.

Also, the hard coating layer including the silicone based antifoulant is excellent in sliding property, and excellent in scratch resistance. In a display device provided with a member for a display device including a hard coating layer including such a silicone based antifoulant, since the sliding property when it is touched with a finger or a stylus pen is excellent, the texture is improved.

In order to improve durability of the antifouling performance, the antifoulant preferably includes a reactive functional group. When the antifoulant does not include the reactive functional group, regardless of whether the member for a display device is a rolled shape or a sheet shape, when the member for a display device is stacked, the antifoulant may be transferred to the surface opposite to the hard coating layer side surface of the member for a display device, and when another layer is adhered or applied onto the surface opposite to the hard coating layer side surface of the member for a display device, another layer may be peeled off, and further, another layer may be peeled off easily when it is bent repeatedly. In contrast to this, when the antifoulant includes the reactive functional group, the durability of the antifoulant property may be excellent.

The number of the reactive functional groups included in the antifoulant may be 1 or more, and preferably 2 or more. By using the antifoulant including 2 or more reactive functional groups, excellent scratch resistance may be imparted to the hard coating layer.

Also, the weight average molecular weight of the antifoulant is preferably 5,000 or less. The weight average molecular weight of the antifoulant may be measured by gel permeation chromatography (GPC).

The antifoulant may be evenly dispersed in the hard coating layer. From the viewpoint of obtaining sufficient antifoulant property with a low adding amount, and also suppressing the deterioration of the strength of the hard coating layer, the antifoulant preferably exist eccentrically on the surface side of the hard coating layer.

Examples of a method for placing the antifoulant eccentrically on the surface side of the hard coating layer may include a method wherein, during the formation of the hard coating layer, the coating film of a curable resin composition for a hard coating layer is dried, and before curing thereof, the coating film is heated to reduce the viscosity of the resin component included in the coating film so as to increase the flowability so that the antifoulant eccentrically exist on the surface side of the hard coating layer; and a method wherein, using an antifoulant with low surface tension, placing the antifoulant eccentrically on the surface of the hard coating layer by floating the antifoulant on the surface of the coating film during the drying of the coating film without applying heat, and then, curing the coating film.

The content of the antifoulant is preferably, for example, 0.01 parts by mass or more and 3.0 parts by mass or less, with respect to 100 parts by mass of the resin component. When the content of the antifoulant is too low, there may be cases where sufficient antifouling property may not be imparted to the hard coating layer. Also, when the content of the antifoulant is too high, the hardness of the hard coating layer may be decreased.

(vi) Another Additive

The hard coating layer may further include an additive, if necessary. The additive is not particularly limited, and is appropriately selected according to the function to be imparted to the hard coating layer. Examples thereof may include inorganic or organic particles configured to adjust the refractive index, an infrared absorber, an antiglare agent, an antifoulant, an antistatic agent, a coloring agent such as a blue pigment and a violet pigment, a leveling agent, a surfactant, an easy lubricant, various sensitizers, a flame retardant, an adhesive imparting agent, a polymerization inhibitor, an antioxidant, a light stabilizer, and a surface modifier.

(d) Thickness of Hard Coating Layer

The thickness of the hard coating layer may be appropriately selected according to the material of the hard coating layer, the function of the hard coating layer and the use application of the member for a display device. For example, when the material of the hard coating layer is an organic material, the thickness of the hard coating layer is preferably, for example, 2 μm or more and 50 μm or less, more preferably 3 μm or more and 30 μm or less, further preferably 5 μm or more and 20 μm or less, and particularly preferably 6 μm or more and 10 μm or less. Also, when the material of the hard coating layer is an inorganic material, the thickness of the hard coating layer may be a several ten nm. When the thickness of hard coating layer is in the above range, sufficient hardness as the hard coating layer may be obtained, as well as a member for a display device having excellent bending resistance may be obtained.

(e) Method for Forming Hard Coating Layer

The method for forming a hard coating layer is appropriately selected according to, for example, material of the hard coating layer, and examples thereof may include a method wherein the resin layer is coated with a curable resin composition for a hard coating layer including the polymerizable compound, and cured; and a vapor-deposition method; and a sputtering method.

The curable resin composition for a hard coating layer includes a polymerizable compound, and as necessary, may further include a polymerization initiator, particles, an ultraviolet absorber, a solvent, and an additive.

The method for applying the curable resin composition for a hard coating layer on the resin layer is not particularly limited as long as it is capable of applying with a desired thickness, and examples thereof may include a general coating method such as a gravure coating method, a gravure reverse coating method, a gravure offset coating method, a spin coating method, a roll coating method, a reverse roll method, a blade coating method, a dip coating method, and a screen printing method. Also, a transfer method may also be used as a method for forming a coating film of a resin composition for a hard coating layer.

The solvent is removed from the coating film of the curable resin composition for a hard coating layer by drying as necessary. Examples of the drying method may include a reduced-pressure drying method, drying by heating, and a combination of these drying methods. For example, the drying may be carried out by heating at temperature of 30° C. or more and 120° C. or less for 10 seconds or more and 180 seconds or less.

The method for curing the coating film of the curable resin composition for a hard coating layer is appropriately selected according to the polymerizable group of the polymerizable compound, and for example, at least one of a light irradiation, and a heating may be used.

For the light irradiation, for example, an ultraviolet ray, a visible ray, an electron beam, or an ionizing radiation irradiation is mainly used. For an ultraviolet ray curing, for example, ultraviolet ray emitted from, for example, a ultra-high pressure mercury lamp, a high pressure mercury lamp, a low pressure mercury lamp, a carbon arc, an xenon arc, and a metal halide lamp may be used. The irradiation amount of the energy ray source may be, for example, approximately an integrated light amount at ultraviolet wave length 365 nm, of 50 $mJ/cm^2$ or more, and 5000 $mJ/cm^2$ or less.

When heating, for example, the treatment may be carried out at temperature of 40° C. or more and 120° C. or less. Also, the reaction may be carried out by leaving the coating film to stand for 24 hours or more at room temperature (25° C.).

(2) Protecting Layer

The member for a display device may further include a protecting layer on the resin layer, on an opposite surface side to the glass substrate.

The protecting layer has transparency. Specifically, the total light transmittance of the protecting layer is preferably 85% or more, more preferably 88% or more, and further preferably 90% or more.

Here, the total light transmittance of the protecting layer may be measured according to JIS K-7361-1, and may be measure with, for example, a haze meter HM150 from Murakami Color Research Laboratory Co., Ltd. Hereinafter, the same may be applied to the measuring method of the total light transmittance of other layers.

The protecting layer is not particularly limited as long as it has transparency, and for example, may include a resin. The resin used for the protecting layer is not particularly limited as long as the resin is a resin capable of obtaining a protecting layer having a transparency, and a general resin may be used.

Examples of the method for placing the protecting layer on one surface of the glass substrate may include a method wherein, using a protecting film as the protecting layer, the resin layer and the protecting film are adhered via a pressure-sensitive adhesive layer; and a method wherein a protecting layer is formed on the resin layer.

The pressure-sensitive adhesive layer has transparency. Specifically, the total light transmittance of the pressure-sensitive adhesive layer is preferably 85% or more, more preferably 88% or more, and further preferably 90% or more.

Examples of the pressure-sensitive adhesive used for the pressure-sensitive adhesive layer may include a pressure-sensitive adhesive such as OCA, or a light-sensitive pressure-sensitive adhesive.

The thickness of the pressure-sensitive adhesive layer is preferably, for example, 1 μm or more and 100 μm or less. When the thickness of the pressure-sensitive adhesive layer is too thick, durability may be deteriorated. Meanwhile, when the thickness of the pressure-sensitive adhesive layer is too thin, the adhesiveness may not be secured so as to be peeled off.

4. Other Constitutions

The member for a display device in the present disclosure may include other layers in addition to the layer described above, if necessary. Examples of the other layers may include a primer layer, a second resin layer, and a decorative layer.

(1) Primer Layer

Figure 3:
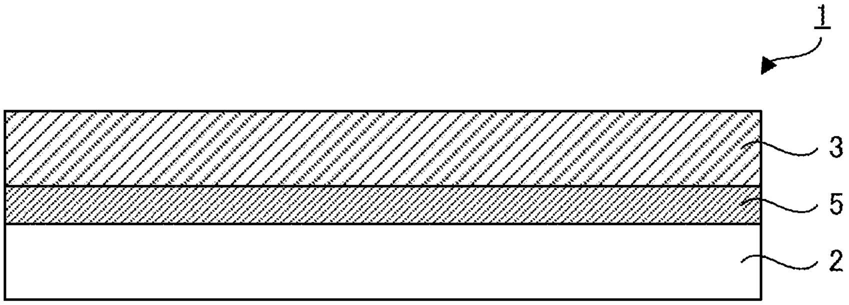
FIG. 3 is a schematic cross-sectional view illustrating an example of the member for a display device in the present disclosure.
Figure 4:
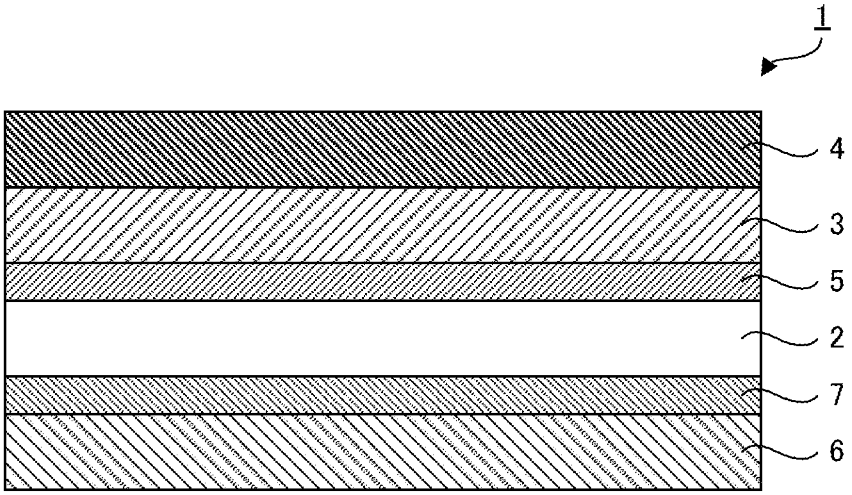
FIG. 4 is a schematic cross-sectional view illustrating an example of the member for a display device in the present disclosure.

As shown in FIG. 3 for example, the member for a display device in the present disclosure may include a primer layer 5 between the glass substrate 2 and the resin layer 3. Also, as shown in FIG. 4 for example, when the member for a display device in the present disclosure includes a second resin layer 6 on the glass substrate 2, on the opposite surface side to the resin layer 3, a primer layer 7 may be included between the glass substrate 2 and the second resin layer 6. By the primer layer, the close adhesiveness between the glass substrate and resin layer, and between the glass substrate and second resin layer may be improved.

The material of the primer layer is not particularly limited as long as it is a material capable of improving the close adhesiveness between the glass substrate and resin layer, or between the glass substrate and second resin layer; and examples thereof may include a resin. Examples of the resin may include (meth)acrylic resins urethane resins, (meth) acrylic-urethane copolymer resin, vinyl chloride-vinyl acetate copolymer resin, polyester resin, butyral resin, chlorinated polypropylene, chlorinated polyethylene, epoxy resin, and silicone resin. One type of these resins may be used alone, and two types or more may be used in combination.

The thickness of the primer layer may be a thickness capable of improving the close adhesiveness between the glass substrate and resin layer, or between the glass substrate and second resin layer, and may be, for example, 0.1 μm or more and 10 μm or less, and preferably 0.2 μm or more and 5 μm or less.

Examples of a method for forming the primer layer may include a method wherein a glass substrate is coated with a composition for a primer layer. Examples of the coating method may include general coating methods such as a gravure coating method, a gravure reverse coating method, a gravure offset coating method, a spin coating method, a roll coating method, a reverse roll coating method, a blade coating method, a dip coating method, and a screen printing method. Also, a transfer method may also be used as a method for forming the primer layer.

(2) Second Resin Layer

As shown in FIG. 4, the member for a display device in the present disclosure may include a second resin layer 6 on the glass substrate 2, on the opposite surface side to the resin layer 3. When an impact is applied to the member for a display device, the impact may be absorbed not only by the resin layer, but also by the second resin layer so that a crack of the glass substrate may be suppressed, and impact resistance may be improved.

The resin included in the second resin layer is not particularly limited as long as it is a resin capable of absorbing an impact, and examples thereof may include urethane resin, epoxy resin, polyimide, polyamideimide, acrylic resin, and triacetyl cellulose (TAC). One kind of these resins may be used alone, and two kinds or more may be used in a combination.

The second resin layer may further include an additive, if necessary. Examples of the additive may include an ultraviolet absorber. The ultraviolet absorber may be similar to the ultraviolet absorber used for the resin layer.

The thickness of the second resin layer may be a thickness capable of absorbing an impact, and is preferably, for example, 5 μm or more and 60 μm or less, more preferably 10 μm or more and 50 μm or less, and further preferably 15 μm or more and 40 μm or less.

The method for forming a second resin layer may be similar to the method for forming the resin layer.

(3) Decorative Layer

The member for a display device in the present disclosure may include a decorative layer between the glass substrate and the resin layer, or on the glass substrate, on the opposite surface side to the resin layer.

The decorative layer includes a colorant and a binder resin. The binder resin included in the decorative layer is not particularly limited, and a resin commonly used for a decorative layer may be used. Also, the colorant included in the decorative layer is not particularly limited, and a known colorant commonly used for a decorative layer may be used.

The decorative layer is usually placed on a part of the glass substrate. Also, the decorative layer may have a patterned shape.

The thickness of the decorative layer is not particularly limited, and may be, for example, 5 μm or more and 40 μm or less.

5. Properties of Member for a Display Device

The total light transmittance of the member for a display device in the present disclosure is preferably, for example, 80% or more, more preferably 85% or more, and further preferably 88% or more. By having such a high total light transmittance, a member for a display device having excellent transparency may be obtained.

Here, the total light transmittance of the member for a display device may be measured according to JIS K7361-1, and may be measure with, for example, a haze meter HM150 from Murakami Color Research Laboratory Co., Ltd.

The haze of the member for a display device in the present disclosure is preferably, for example 2.0% or less, more preferably 1.5% or less, and further preferably 1.0% or less. By having such a low haze, a member for a display device having excellent transparency may be obtained.

Here, the haze of the member for a display device may be measured according to JIS K-7136, and may be measure with, for example, a haze meter HM150 from Murakami Color Research Laboratory Co., Ltd.

The member for a display device in the present disclosure preferably has a bending resistance. Specifically, when the dynamic bending test described below is carried out to the member for a display device repeatedly for 200,000 times, it is preferable that a crack or a fracture does not occur in the member for a display device, and it is more preferable that a crack or a fracture does not occur in the member for a display device when the dynamic bending test is carried out repeatedly for 1,000,000 times.

In the dynamic bending test, the member for a display device may be folded so that the glass substrate is on the outer side, or the member for a display device may be folded so that the glass substrate is on the inner side; and in either of these cases, it is preferable that a crack or a fracture does not occur in the member for a display device.

Figure 5A:
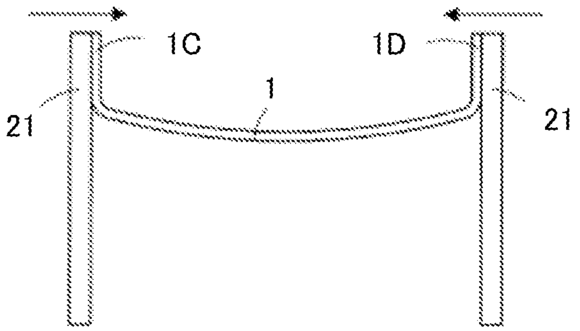
FIGS. 5A to 5C are schematic views explaining a dynamic bending test.
Figure 5B:
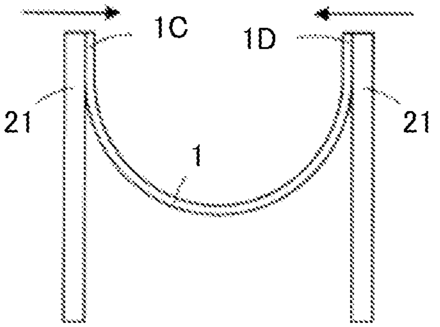
Figure 5C:
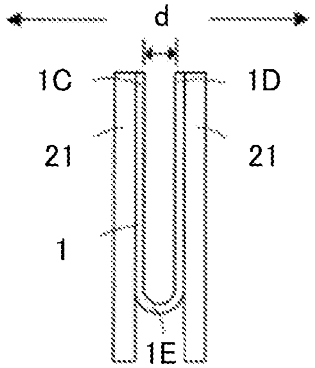

The dynamic bending test is carried out as follows. Firstly, in the dynamic bending test, as shown in FIG. 5A, short side portion 1C and short side portion 1D opposing to the short side portion 1C of a member for a display device 1 having a size of 20 mm×100 mm are respectively fixed by parallelly arranged fixing portions 21. Also, as shown in FIG. 5A, the fixing portions 21 are movable by sliding in horizontal direction. Then, as shown in FIG. 5B, by moving the fixing portions 21 so as to be closer to each other, the member for a display device 1 is deformed so as to be folded. Further, as shown in FIG. 5C, after moving the fixing portions 21 to the position wherein distance "d" between the two opposing short side portions 1C and 1D of the member for a display device 1 fixed by the fixing portions 21 is a predetermined value, the deformation of the member for a display device 1 is dissolved by moving the fixing portions 21 in opposite directions. As shown in FIGS. 5A to 5C, by moving the fixing portions 21, the member for a display device 1 may be folded into 180°. Also, by carrying out the dynamic bending test so that bent portion 1E of the member for a display device 1 does not protrude from the lower end edge of the fixing portions 21, and by controlling the distance "d" when the fixing portions 21 are the closest, distance "d" between the two opposing short side portions 1C and 1D of the member for a display device 1 may be a predetermined value. For example, in a case where distance "d" between the two opposing short side portions 1C and 1D is 10 mm, the outer diameter of the bent portion 1E is regarded as 10 mm.

In the member for a display device, it is preferable that a crack or a fracture does not occur when a test wherein the member for a display device 1 is folded into 180° so that the distance "d" between the opposing short side portions 1C and 1D of the member for a display device 1 is 10 mm, is carried out repeatedly for 200,000 times; and it is more preferable that a crack or a fracture does not occur when a dynamic bending test wherein the member for a display device is folded into 180° so that the distance "d" between the opposing short side portions of the member for a display device is 10 mm, 8 mm, 6 mm, 5 mm, 4 mm, 3 mm, 2.5 mm, or 2 mm is carried out repeatedly for 200,000 times.

Also, when the static bending test described below is carried out to the member for a display device, the opening angle θ after the static bending test in the member for a display device is preferably 100° or more.

Figure 6A:
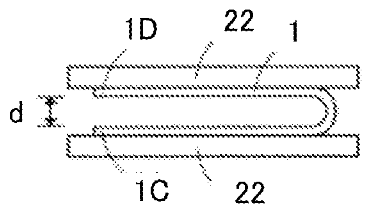
FIGS. 6A to 6B are schematic views explaining a static bending test.
Figure 6B:
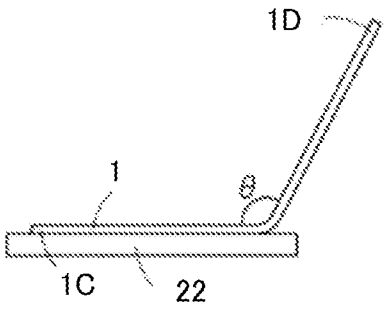

The static bending test is carried out as follows. Firstly, as shown in FIG. 6A, short side portion 1C and short side portion 1D opposing to the short side portion 1C of a member for a display device 1 are respectively fixed by parallelly arranged fixing portions 22 so that distance "d" between the short side portion 1C and short side portion 1D is a predetermined value. Then, a static bending test wherein the member for a display device 1 is left to stand at 23° C. for 240 hours under a folded condition, is carried out. Then, as shown in FIG. 6B, by taking the fixing portion 22 off from the short side portion 1D after the static bending test, the folded condition is dissolved, and after 30 minutes at room temperature, the opening angle θ that is an angle the member for a display device 1 opens naturally is measured. Incidentally, the larger the opening angle θ is, the higher the restorability is, and is 180° at a maximum.

In the member for a display device, it is preferable that the opening angle θ after the static bending test wherein the distance "d" between the opposing short side portions 1C and 1D of the member for a display device 1 is 10 mm, is 100° or more.

In the static bending test, the member for a display device may be folded so that the glass substrate is on the inner side, or the member for a display device may be folded so that the glass substrate is on the outer side; and in either of these cases, the opening angle θ is preferably 100° or more.

6. Use Application of Member for a Display Device

The member for a display device in the present disclosure may be used as a member placed on the observer side of the display panel in a display device. The member for a display device in the present disclosure may be used as a member for a display device in, for example, smart phones, tablet terminals, wearable terminals, personal computers, televisions, digital signages, public information displays (PIDs), and car mounted displays. Among them, the member for a display device in the present disclosure may be preferably used for a flexible display device such as a foldable display, a rollable display, and a bendable display, and may be preferably used as a member for a foldable display.

In the member for a display device in the present disclosure, the outermost surface after placing the member for a display device on the surface of a display device is preferably the resin layer side surface.

The method for placing the member for a display device in the present disclosure on the surface of a display device is not particularly limited, and examples thereof may include a method via an adhesive layer. As for the adhesive layer, a known adhesive layer used to adhere a member for a display device may be used.

B. Optical Stacked Body

In order to solve the problem, as the result of intensive studies, the inventors of the present disclosure have found out that the crack of the glass substrate may be suppressed and impact resistance may be improved by using a thin flexible glass substrate, and by placing a resin layer on one surface side of the glass substrate. Further, they have found out that, by setting the composite elastic modulus of the resin layer in a predetermined range, the crack of the glass substrate may be suppressed and impact resistance may be improved, even when the thickness of the resin layer is made relatively thin in order to improve flexibility. Also, the inventors of the present disclosure have further studies and found out that, by stacking a first resin layer having a predetermined composite elastic modulus, a second resin layer which is a pressure-sensitive adhesive layer, and a third resin layer which is a predetermined resin film, the crack of the glass substrate may further be suppressed and impact resistance may further be improved, compared to a case of including only a resin layer having a predetermined composite elastic modulus. In addition, by stacking the specific first resin layer, second resin layer, and third resin layer, a shard or sharp edge is not exposed even when the glass substrate is broken so that safer use is possible. The optical stacked body in the present disclosure is based on such findings.

The optical stacked body in the present disclosure comprises a glass substrate, a first resin layer, a second resin layer, and a third resin layer, in this order, wherein a thickness of the glass substrate is 100 μm or less; a composite elastic modulus of the first resin layer is 5.7 GPa or more, and a thickness of the first resin layer is 5 μm or more and 60 μm or less; the second resin layer is a pressure-sensitive adhesive layer; and the third resin layer is a resin film including a resin selected from the group consisting of a polyester based resin, a polycycloolefin based resin, an acetylcellulose based resin, a polycarbonate based resin, and a polypropylene based resin.

Figure 7:
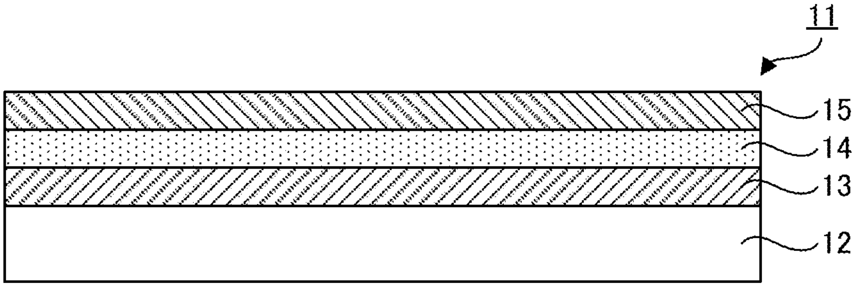
FIG. 7 is a schematic cross-sectional view illustrating an example of the optical stacked body in the present disclosure.

FIG. 7 is a schematic cross-sectional view illustrating an example of an optical stacked body in the present disclosure. As shown in FIG. 7, an optical stacked body 11 comprises a glass substrate 12, a first resin layer 13, a second resin layer 14, and a third resin layer 15, in this order. The glass substrate 12 has a predetermined thickness, the first resin layer 13 has a predetermined thickness and a predetermined composite elastic modulus, the second resin layer 14 is a pressure-sensitive adhesive layer, and the third resin layer 15 is a resin film including a predetermined resin.

Since the thickness of the glass substrate in the present disclosure is the predetermined value or less, and the thickness is thin, there is a concern that it is easily cracked, and low in the impact resistance. However, since the first resin layer having the predetermined composite elastic modulus, the second resin layer which is a pressure-sensitive adhesive layer, and the third resin layer which is the predetermined resin film, are stacked in this order on one surface side of the glass substrate, when an impact is applied to the optical stacked body, the first resin layer, the second resin layer, and the third resin layer may absorb the impact and a crack of the glass substrate may be suppressed so that the impact resistance may be improved. Even though the reason therefor is not clear, it is presumed as follows.

That is, since the first resin layer has the predetermined composite elastic modulus, the second resin layer is a pressure-sensitive adhesive layer, and the third resin layer is the predetermined resin film, the second resin layer is a layer softer than the first resin layer and the third resin layer, and the third resin layer is a layer softer than the first resin layer. For example, as for the composite elastic modulus of the resin included in the resin film constituting the third resin layer, polyethylene terephthalate (PET) is 2.8 to 4 GPa, polycycloolefin (COP) is 2.1 GPa, triacetyl cellulose (TAC) is 1.4 GPa, polycarbonate (PC) is 2.4 GPa, and polypropylene (PP) is 2 GPa, the third resin layer may be said to be a layer softer than the first resin layer. Therefore, as compared to a case wherein only the first resin layer is placed on ne surface side of the glass substrate, in a case wherein the first resin layer, the second resin layer, and the third resin layer, are stacked in this order on one surface side of the glass substrate, the impact applied to the optical stacked body is thought to be easily dispersed, since the second resin layer and the third resin layer are easily deformed than the first resin layer.

Also, by placing the second resin layer and the third resin layer those are softer than the first resin layer, on the first resin layer, on the opposite surface side to the glass substrate, an impact applied to the optical stacked body is thought to be hardly propagated to the glass substrate. Therefore, when the first resin layer, second resin layer, and third resin layer are stacked, compared to a case of only the first resin layer, an impact absorptivity is presumed to be high. Also, when only the second resin layer and third resin layer are stacked in this order on one surface side of the glass substrate, since the second resin layer and third resin layer are relatively soft so as to be easily deformed, when an impact is applied to the optical stacked body, the glass substrate may be damaged before the impact is sufficiently and thoroughly absorbed. Thus, when the first resin layer, second resin layer, and third resin layer are stacked, impact resistance is presumed to be high, compared to a case wherein only the second resin layer and third resin layer are stacked.

Incidentally, as described in the section of the member for a display device above, the composite elastic modulus of the first resin layer is employed in the present disclosure. This is because, pressing an indenter onto a measurement sample, in the measurement of the composite elastic modulus of the first resin layer by the nanoindentation method (indentation test method), is similar to a pen tip being crashing and pressed into a sample in the pen dropping test.

According to the present disclosure, by the composite elastic modulus of the first resin layer being the predetermined value or more, impact resistance in the pen dropping test may be improved.

Also, in the present disclosure, even when the glass substrate is broken, the first resin layer, second resin layer, and third resin layer may suppress the glass from being scattered.

Also, according to the present disclosure, since the thickness of the glass substrate is thin as to be the predetermined value or less, the thickness of the first resin layer having the composite elastic modulus of the predetermined value or more, is relatively thin as to be in the predetermined range, the second resin layer is a pressure-sensitive adhesive layer as to be a relatively soft layer, and the third resin layer is the predetermined resin film, flexibility may be increased. Therefore, when the optical stacked body is bent, a crack in the first resin layer, second resin layer, and third resin layer may be suppressed, so that the bending resistance may be maintained. Therefore, the optical stacked body in the present disclosure is foldable, may be used as a wide variety of the optical stacked body, and for example, it may be used as a member for a foldable display.

Also, according to the present disclosure, since the composite elastic modulus of the first resin layer is the predetermined value or more, the restoring force when the first resin layer is deformed, may be increased. Therefore, by the composite elastic modulus of the first resin layer being the predetermined value or more, the restoring property after the optical stacked body is kept under a bent condition for a long time, may be increased. Also, the storing property after the optical stacked body is folded repeatedly, may be increased.

As described above, the present disclosure is able to provide an optical stacked body excellent in the impact resistance and flexibility. Further, even when the glass substrate is broken, a risk of a human body being injured may be decreased so that an optical stacked body with greater safety may be provided.

Each constitution of the optical stacked body in the present disclosure is hereinafter described.

1. First Resin Layer

The first resin layer in the present disclosure is a member wherein the composite elastic modulus is 5.7 GPa or more, the thickness thereof is 5 μm or more and 60 μm or less, and placed on one surface side of the glass substrate. The first resin layer is a member having an impact absorbing property, and also functions as a member suppressing the scattering of glass, when the glass substrate is broken. The first resin layer has transparency, and when the optical stacked body in the present disclosure is placed on the observer side of the display panel of a display device, it is placed on the observer side than the glass substrate.

(1) Properties of First Resin Layer

The composite elastic modulus of the first resin layer may be similar to the composite elastic modulus of the resin layer in the member for a display device described above.

Here, the method for measuring the composite elastic modulus of the first resin layer may be similar to the method for measuring the composite elastic modulus of the resin layer in the member for a display device described above.

Incidentally, in order to avoid an influence of the glass substrate, and in order to avoid an influence of the side edge of the first resin layer, the Berkovich indenter shall be compressed into a portion of the first resin layer which is 500 nm away from the interface between the glass substrate and the first resin layer toward the center of the first resin layer, and 500 nm away from both side edges of the first resin layer respectively toward the center of the first resin layer. Also, the Berkovich indenter shall be compressed into a portion of the first resin layer which is 500 nm away from the interface between the second resin layer and first resin layer toward the center of the first resin layer.

(2) Constitution of First Resin Layer

The thickness of the first resin layer may be similar to the thickness of the resin layer in the member for a display device described above.

Also, the arrangement of the first resin layer with respect to the glass substrate may be similar to the arrangement of the resin layer, with respect to the glass substrate, in the member for a display device described above.

(3) Material of First Resin Layer (a) Resin

The resin included in the first resin layer may be similar to the resin included in the resin layer in the member for a display device described above.

(b) Ultraviolet Absorber

The first resin layer may include an ultraviolet absorber. The ultraviolet absorber may be similar to the ultraviolet absorber included in the resin layer in the member for a display device described above.

(c) Other Additives

The first resin layer may further include an additive, if necessary. The additive may be similar to the additive included in the resin layer in the member for a display device described above.

(4) Method for Forming First Resin Layer

The method for forming the first resin layer may be similar to the method for forming the resin layer in the member for a display device described above.

2. Second Resin Layer

The second resin layer in the present disclosure is a pressure-sensitive adhesive layer. Via the second resin layer which is a pressure-sensitive adhesive layer, the first resin layer and the third resin layer which is the predetermined resin film may be adhered. The second resin layer is a member having an impact absorbing property. The second resin layer has transparency, and when the optical stacked body in the present disclosure is placed on the observer side of the display panel of a display device, it is placed on the observer side than the glass substrate.

The second resin layer has transparency. Specifically, the total light transmittance of the second resin layer is preferably 85% or more, more preferably 88% or more, and further preferably 90% or more.

Here, the total light transmittance of the second resin layer may be measured according to JIS K7361-1, and may be measure with, for example, a haze meter HM150 from Murakami Color Research Laboratory Co., Ltd. Hereinafter, the same may be applied to the measuring method of the total light transmittance of other layers.

The pressure-sensitive adhesive used for the second resin layer is not particularly limited as long as it is a pressure-sensitive adhesive capable of obtaining a pressure-sensitive adhesive layer having transparency, and for example, OCA (Optical Clear Adhesive) may be used. Specifically, examples thereof may include an acrylic based pressure-sensitive adhesive, a silicone based pressure-sensitive adhesive, an urethane based pressure-sensitive adhesive, a rubber based pressure-sensitive adhesive, a polyvinyl ether based pressure-sensitive adhesive, and a polyvinyl acetate based pressure-sensitive adhesive.

The thickness of the second resin layer is preferably, for example, 1 μm or more and 100 μm or less. When the thickness of the second resin layer is too thick, bending property may be deteriorated. Meanwhile, when the thickness of the second resin layer is too thin, adhesiveness may not be secured so as to be peeled off.

As the second resin layer, for example, a pressure-sensitive adhesive film may be used. Also, for example, the first resin layer or the third resin layer may be coated with a pressure-sensitive adhesive composition to form the second resin layer.

3. Third Resin Layer

The third resin layer in the present disclosure is a resin film including a resin selected from the group consisting of a polyester based resin, a polycycloolefin based resin, an acetylcellulose based resin, a polycarbonate based resin, and a polypropylene based resin. The third resin layer is a member having impact absorbing property, and also functions as a member suppressing the scattering of glass, when the glass substrate is broken. The third resin layer has transparency, and when the optical stacked body in the present disclosure is placed on the observer side of the display panel of a display device, it is placed on the observer side than the glass substrate.

The third resin layer has transparency. Specifically, the total light transmittance of the third resin layer is preferably 85% or more, more preferably 88% or more, and further preferably 90% or more.

The resin included in the resin film constituting the third resin layer is a resin selected from the group consisting of a polyester based resin, a polycycloolefin based resin, an acetylcellulose based resin, a polycarbonate based resin, and a polypropylene based resin. The polyester based resin is not particularly limited as long as it is capable of obtaining a resin film having transparency, and examples thereof may include polyethylene terephthalate (PET), polyethylene naphthalate (PEN), and polybutylene terephthalate (PBT). Also, polycycloolefin based resin is not particularly limited as long as it is capable of obtaining a resin film having transparency, and examples thereof may include a norbornene based resin, a monocyclic olefine based resin, a cyclic conjugation diene based resin, a vinyl alicyclic hydrocarbon based resin, and a hydrate thereof. Also, the acetylcellulose based resin is not particularly limited as long as it is capable of obtaining a resin film having transparency, and examples thereof may include a triacetyl cellulose (TAC). The polycarbonate based resin is not particularly limited as long as it is capable of obtaining a resin film having transparency, and examples thereof may include a polycarbonate (PC). The polypropylene based resin is not particularly limited as long as it is capable of obtaining a resin film having transparency, and examples thereof may include a polypropylene (PP).

The third resin layer may include an additive such as a filler, an ultraviolet absorber, a stabilizer, an antioxidant, an antistatic agent, a flame retardant, and an easy lubricant, if necessary.

The thickness of the third resin layer is preferably, for example, 0.5 μm or more and 30 μm or less, more preferably 1.0 μm or more and 25 μm or less, and further preferably 1.5 μm or more and 20 μm or less. When the thickness of the third resin layer is too thick, flexibility and bending property may be deteriorated. Meanwhile, when the thickness of the third resin layer is too thin, sufficient impact resistance may not be obtained.

The third resin layer which is a resin film may be adhered to the first resin layer via the second resin layer which is a pressure-sensitive adhesive layer.

4. Glass Substrate

The glass substrate in the present disclosure has a thickness of 100 μm or less, and is a member configured to support the first resin layer. The glass substrate may be similar to the glass substrate in the member for a display device described above.

5. Functional Layer

The optical stacked body in the present disclosure may further include a functional layer on the third resin layer, on an opposite surface side to the second resin layer. Examples of the functional layer may include a hard coating layer, an antireflection layer, and an antiglare layer.

Also, the functional layer may be a single layer, and may include a plurality of layers. Also, the functional layer may be a layer having a single function, and may include a plurality of layers having functions different from each other.

(1) Hard Coating Layer

Figure 8:
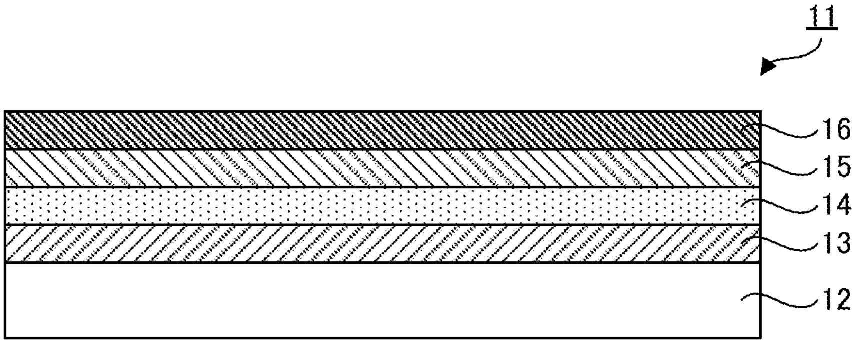
FIG. 8 is a schematic cross-sectional view illustrating an example of the optical stacked body in the present disclosure.

For example, as shown in FIG. 8, the optical stacked body in the present disclosure preferably further includes hard coating layer 16 on the third resin layer 15, on the opposite surface side to the second resin layer 14. The hard coating layer is a member configured to increase the surface hardness. By placing the hard coating layer, scratch resistance may be improved.

The hard coating layer may be similar to the hard coating layer in the member for a display device described above.

6. Other Constitutions

The optical stacked body in the present disclosure may include other layers in addition to the layers described above, if necessary.

(1) Second Hard Coating Layer

Figure 9:
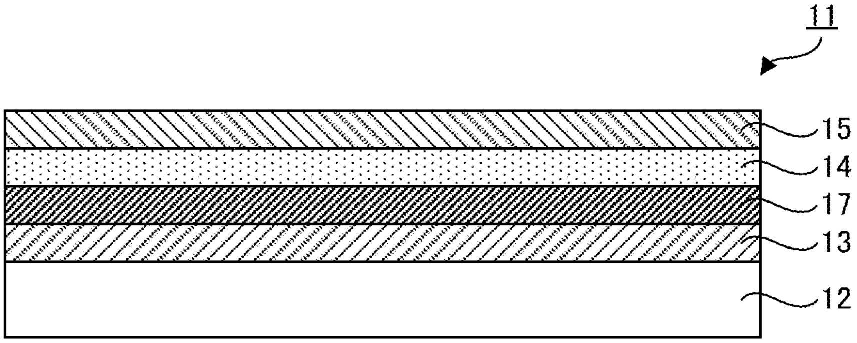
FIG. 9 is a schematic cross-sectional view illustrating an example of the optical stacked body in the present disclosure.

For example, as shown in FIG. 9, the optical stacked body in the present disclosure may further include a second hard coating layer 17 between the first resin layer 13 and the second resin layer 14. The second hard coating layer is a member configured to increase the surface hardness. By placing the second hard coating layer, impact resistance may be improved.

Incidentally, since the second hard coating layer may be similar to the hard coating layer described above, the explanation is omitted herein.

(2) Fourth Resin Layer

The optical stacked body in the present disclosure may include a fourth resin layer on the glass substrate, on the opposite surface side to the first resin layer. When an impact is applied to the optical stacked body, not only the first resin layer, the second resin layer, and the third resin layer, but also the fourth resin layer may absorb the impact and a crack of the glass substrate may be suppressed so that impact resistance may be improved.

The resin included in the fourth resin layer is not particularly limited as long as it is a resin capable of absorbing an impact, and examples thereof may include urethane resin, epoxy resin, polyimide, polyamideimide, acrylic resin, and triacetyl cellulose (TAC). One kind of these resins may be used alone, and two kinds or more may be used in a combination.

The fourth resin layer may further include an additive, if necessary. Examples of the additive may include a filler, an ultraviolet absorber, a stabilizer, an antioxidant, an antistatic agent, a flame retardant, and an easy lubricant, if necessary.

The thickness of the fourth resin layer may be a thickness capable of absorbing an impact, and is preferably, for example, 5 μm or more and 60 μm or less, more preferably 10 μm or more and 50 μm or less, and further preferably 15 μm or more and 40 μm or less.

The method for forming the fourth resin layer may be similar to the method for forming the first resin layer.

(3) Primer Layer

The optical stacked body in the present disclosure may include a primer layer between the glass substrate and the first resin layer. Also, when the optical stacked body in the present disclosure includes the fourth resin layer on the glass substrate, on the opposite surface side to the first resin layer, a primer layer may be included between the glass substrate and the fourth resin layer. By the primer layer, the close adhesiveness between the glass substrate and first resin layer, and the close adhesiveness between the glass substrate and fourth resin layer may be improved.

The primer layer may be similar to the primer layer in the member for a display device described above.

(4) Decorative Layer

The optical stacked body in the present disclosure may include a decorative layer between the glass substrate and the first resin layer, or on the glass substrate, on the opposite surface side to the first resin layer.

The decorative layer may be similar to the decorative layer in the member for a display device described above.

7. Optical Stacked Body

In the optical stacked body in the present disclosure, the total thickness of the resin layers placed on the first resin layer surface side of the glass substrate is not particularly limited as long as it is a thickness capable of obtaining impact resistance and flexibility, and is preferably, for example, 143 μm or less, and more preferably 135 μm or less. By the total thickness of the resin layers being in the range, the bending property of the optical stacked body may be improved.

Incidentally, the resin layers placed on the first resin layer surface side of the glass substrate refers to all the layers including resin, among the layers placed on the first resin layer surface side of the glass substrate. The resin layers include at least the first resin layer, second resin layer, and third resin layer described above, and may further include the functional layer, second hard coating layer, primer layer, and decorative layer described above.

The total light transmittance and haze of the optical stacked body in the present disclosure may be similar to those of the member for a display device described above.

The optical stacked body in the present disclosure preferably has bending resistance. Specifically, when the dynamic bending test described below is carried out to the optical stacked body repeatedly for 200,000 times, it is preferable that a crack or a fracture does not occur in the optical stacked body.

In the dynamic bending test, the optical stacked body may be folded so that the glass substrate is on the outer side, or the optical stacked body may be folded so that the glass substrate is on the inner side; and in either of these cases, it is preferable that a crack or a fracture does not occur in the optical stacked body.

The dynamic bending test may be similar to the dynamic bending test described in the section of the member for a display device above.

In the optical stacked body, it is preferable that a crack or a fracture does not occur when a test wherein the optical stacked body 1 is folded into 180° so that the distance "d" between the opposing short side portions 1C and 1D of the optical stacked body 1 is 10 mm, is carried out repeatedly for 200,000 times. Among the above, it is more preferable that a crack or a fracture does not occur when a test wherein the optical stacked body 1 is folded into 180° so that the distance "d" between the opposing short side portions of the optical stacked body 1 is 8 mm is carried out repeatedly for 70,000 times, it is further preferable that a crack or a fracture does not occur when the test is carried out repeatedly for 100,000 times, and it is particularly preferable that a crack or a fracture does not occur when the test is carried out repeatedly for 200,000 times.

Also, when the static bending test described below is carried out to the optical stacked body, the opening angle θ after the static bending test in the optical stacked body is preferably 100° or more.

The static bending test may be similar to the static bending test described in the section of the member for a display device above.

In the optical stacked body, it is preferable that the opening angle θ after the static bending test is 1000 or more, when a static bending test wherein the distance "d" between the opposing short side portions 1C and 1D of the optical stacked body 1 is 10 mm.

In the static bending test, the optical stacked body may be folded so that the glass substrate is on the inner side, or the optical stacked body may be folded so that the glass substrate is on the outer side; and in either of these cases, the opening angle θ is preferably 100° or more, and more preferably 130° or more.

The use application of the optical stacked body in the present disclosure may be similar to that of the member for a display device described above.

When placed on the surface of a display device, the optical stacked body in the present disclosure is placed so that the glass substrate side surface is on the display panel side, and the third resin layer side surface is on the outer side.

The method for placing the optical stacked body in the present disclosure on the surface of a display device may be similar to that of the member for a display device described above.

B. Display Device

The display device in the present disclosure comprises: a display panel, and the member for a display device or optical stacked body described above placed on an observer side of the display panel.

Figure 10:
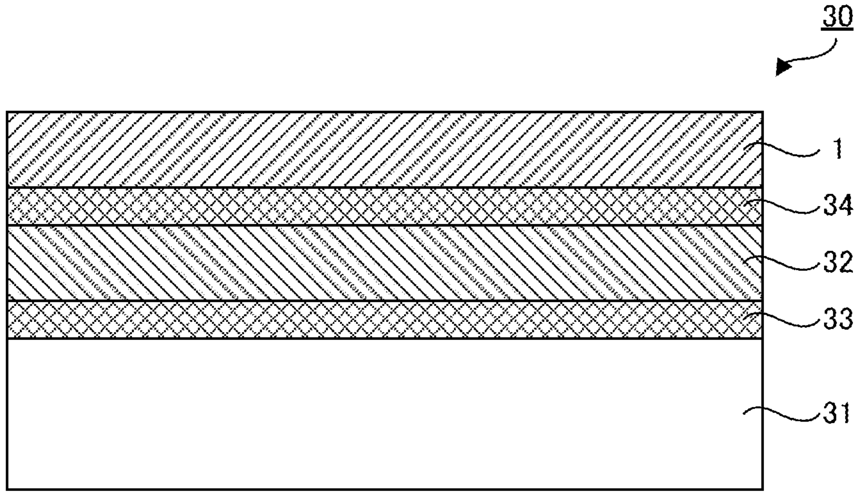
FIG. 10 is a schematic cross-sectional view illustrating an example of the display device in the present disclosure.

FIG. 10 is a schematic cross-sectional view illustrating an example of a display device in the present disclosure. As shown in FIG. 10, display device 30 comprises display panel 31, touch-sensitive panel member 32, display panel 31, and the member for a display device 1 placed on an observer side of the touch-sensitive panel member 32. In the display device 30, the member for a display device 1 is used as a member placed on the surface of the display device 30, and an adhesive layer 34 is placed between the member for a display device 1 and touch-sensitive panel member 32. An adhesive layer 33 is also placed between the display panel 31 and touch-sensitive panel member 32.

Figure 11:
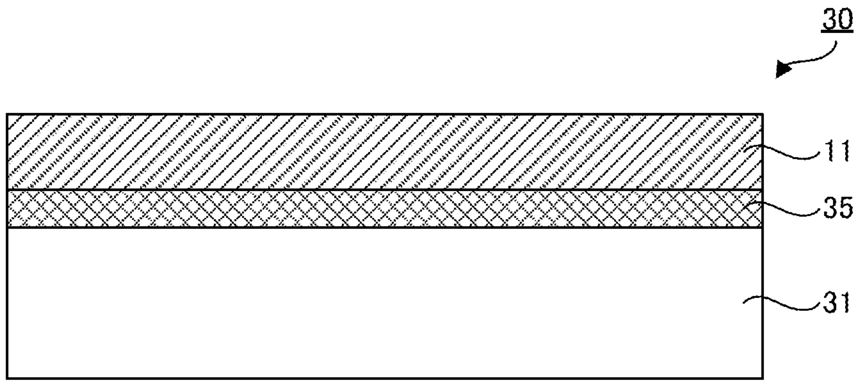
FIG. 11 is a schematic cross-sectional view illustrating an example of the display device in the present disclosure.

FIG. 11 is a schematic cross-sectional view illustrating another example of the display device in the present disclosure. As shown in FIG. 11, display device 30 comprises display panel 31, and an optical stacked body 11 placed on an observer side of the display panel 31. In the display device 30, the optical stacked body 11 is used as a member placed on the surface of the display device 30, and an adhesive layer 35 is placed between the optical stacked body 11 and display panel 31.

The member for a display device in the present disclosure may be similar to the member for a display device described above.

The optical stacked body in the present disclosure may be similar to the optical stacked body described above.

Examples of the display panel in the present disclosure may include a display panel used for a display device such as a liquid crystal display device, an organic EL display device, and a LED display device.

The display device in the present disclosure may include a touch-sensitive panel member between the display panel and the member for a display device or between the display panel and the optical stacked body.

The display device in the present disclosure is preferably a flexible display. Among the above, the display device in the present disclosure is preferably foldable. That is, the display device in the present disclosure is more preferably a foldable display. Since the display device in the present disclosure includes the member for a display device described above, it is excellent in bending resistance, or since the display device in the present disclosure includes the optical stacked body described above, it is excellent in impact resistance and flexibility, and is preferable as a flexible display, further a foldable display.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is hereinafter explained in further details with reference to Examples and Comparative Examples.

Example 1-1

(1) Formation of Primer Layer

Each component was blended so as to be the composition shown below, to prepare a composition for a primer layer.

Bisphenol A type solid epoxy resin (jER1256B40 from Mitsubishi Chemical Corporation): 28 parts by mass Bisphenol A novolac type solid epoxy resin: (jER157S65B80 from Mitsubishi Chemical Corporation): 5 parts by mass 2-ethyl-4-methylimidazole (from Tokyo Chemical Industry Co., Ltd.): 1 part by mass Solvent (MEK): 11 parts by mass A chemically strengthened glass substrate with a thickness of 70 μm was prepared, the composition for a primer layer was applied to the glass substrate so as to have a predetermined thickness, dried at 80° C. for 3 minutes and at 150° C. for 60 minutes to form a primer layer with a thickness of 1 μm.

(2) Formation of Resin Layer

With reference to Synthesis Example 1 of WO 2014/046180, a tetracarboxylic acid dianhydride represented by the following chemical formula was synthesized.

[Chemical 13]

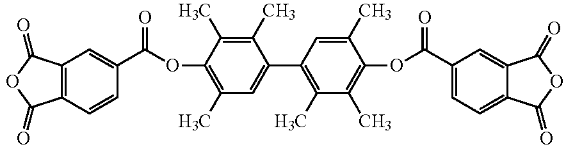

To a separable flask of 5 L, a solution wherein dehydrated N,N-dimethylacetamide (DMAc) (1833.2 g) and 2,2'-bis(trifluoromethyl)benzidine (TFMB) (138.48 g) were dissolved was added, controlling the liquid temperature to 30° C., the tetracarboxylic acid dianhydride (TMPBPTME) (176.70 g) represented by the chemical formula was gradually charged so that the temperature rise was 2° C. or less, and stirred with a mechanical stirrer for 30 minutes. Then, pyromellitic acid dianhydride (PMDA) (64.20 g) was gradually charged in several times so that the temperature rise was 2° C. or less, thereby synthesizing a polyimide precursor solution wherein polyimide precursor was dissolved (solid content of 18% by mass). The molar ratio (TMPBPTME:PMDA) between TMPBPTME of the tetracarboxylic acid dianhydride used in the polyimide precursor and PMDA was 90:10. The weight average molecular weight of the polyimide precursor was 75,000.

To a separable flask of 5 L, the polyimide precursor solution (2162 g) cooled to room temperature was added under a nitrogen atmosphere. Dehydrated N,N-dimethylacetamide (432 g) was added thereto, and stirred until uniform. Then, pyridine (6.622 g) which is a catalyst, and acetic acid anhydride (213.67 g) were added and stirred at room temperature for 24 hours to synthesize a polyimide solution.

To the obtained polyimide solution, N,N-dimethylacetamide (DMAc) (2000 g) was added and stirred until uniform. Then, the polyimide solution was transferred and divided to 5 L beakers into equal thirds, and isopropyl alcohol (3500 g) was gradually added to each of the beakers to obtain white slurry. The slurry was transferred onto a Buchner funnel, filtered, and then, a process of washing by running with isopropyl alcohol (total 9000 g) and then filtering, was repeated for three times, and dried at 110° C. using a vacuum dryer to obtain polyimide (polyimide powder). The weight average molecular weight of the polyimide measured by GPC was 100,000.

To the polyimide, N,N-dimethylacetamide (DMAc) was added that the solid content concentration of the polyimide was 12% by mass, and a polyimide varnish (resin composition) including 12% by mass of the polyimide in varnish was prepared. The viscosity of the polyimide varnish (resin composition) (solid content: 12% by mass) at 25° C. was 15000 cps.

The primer layer was coated with the polyimide varnish (resin composition) so as to have a predetermined thickness, and dried at 100° C. for 10 minutes, at 150° C. for 10 minutes, and at 230° C. for 30 minutes to form a resin layer with a thickness of 5 μm to 60 μm.

(3) Formation of Hard Coating Layer

Each component was blended so as to be the composition shown below, and a curable resin composition for a hard coating layer was prepared.

A mixture of dipentaerythritol pentaacrylate and dipentaerythritol hexaacrylate (M403, from Toagosei Co., Ltd.): 25 parts by mass Dipentaerythritol EO modified hexaacrylate (A-DPH-6E, from Shin-Nakamura Chemical Co., Ltd.): 25 parts by mass Deformed silica fine particles (average particle size: 25 nm, from JGC Catalytic Chemicals Co., Ltd.): 50 parts by mass (solid conversion)

Photopolymerization initiator (Irg184) 4 parts by mass

Fluorine based leveling agent (F568, from DIC Co., Ltd.) 0.2 parts by mass (solid conversion)

Ultraviolet absorber 1 (DAINSORB P6, from Daiwa Chemical Co., Ltd.) 3 parts by mass Solvent (MIBK) 150 parts by mass The resin layer was coated with the curable resin composition for a hard coating layer so as to have a predetermined thickness, dried at 80° C. for 3 minutes, and then cured by ultraviolet irradiation to form a hard coating layer with a thickness of 10 μm.

Example 1-2

A member for a display device was prepared in the same manner as in Example 1-1, except that the resin layer was formed as described below.

A separable flask of 500 mL was $N_2$ substituted, and into a solution wherein 293.29 g of dehydrated dimethylacetamide (DMAc) and 14.3 g of 2,2'-bis(trifluoromethyl)benzidine (TFMB) (44.7 mmol) were dissolved, which is controlled so as to be a liquid temperature of 30° C., 24.8 g (40.1 mmol) of the tetracarboxylic acid dianhydride (TMPBPTME) used in Example 1 was gradually charged so that the temperature rise was 2° C. or less, and stirred with a mechanical stirrer for 3 hours. Then, 0.91 g (4.5 mmol) of terephthalic acid dichloride (TPC) was added to the above solution and stirred for another 3 hours to obtain a polyamide acid solution. Then, 6.66 g (84.2 mmol) of pyridine which is a catalyst and 8.60 g (84.2 mmol) of acetic acid anhydride were charged, and the mixture was stirred at 25° C. for 30 minutes to confirm that the solution was uniform, and then, heated to 70° C. and stirred for 1 hour. Then, 174.26 g of 2-propyl alcohol (IPA) was gradually added to the solution cooled to ordinary temperature to obtain a solution wherein a slight turbidity was observed. To the turbid solution, 435.64 g of IPA was added at once to obtain a white slurry. The slurry was filtered, washed with IPA for five times, and dried in an oven heated to 100° C. under reduced pressure for 6 hours to obtain a polyamideimide powder (37.1 g). The weight average molecular weight of the polyamideimide measured by GPC was 62000.

To the polyamideimide, DMAc was added so that the solid content concentration of the polyamideimide was 19% by mass, and a polyamideimide varnish including 19% by mass of the polyamideimide in varnish was prepared. The viscosity of the polyamideimide varnish (solid content concentration: 19% by mass) at 25° C. was 4000 mPa·s.

The primer layer was coated with the polyamideimide varnish (resin composition) so as to have a predetermined thickness, and dried at 100° C. for 10 minutes, at 150° C. for 10 minutes, and at 230° C. for 30 minutes to form a resin layer with a thickness of 5 μm to 60 μm.

Example 1-3

A member for a display device was prepared in the same manner as in Example 1-1, except that the resin layer was formed as described below.

To a separable flask of 5 L, a solution wherein dehydrated N,N-dimethylacetamide (DMAc) (1833.2 g) and 2,2'-bis (trifluoromethyl)benzidine (TFMB) (138.48 g) were dissolved was added, controlling the liquid temperature to 30° C., the tetracarboxylic acid dianhydride (TMPBPTME) (256.026 g) represented by the chemical formula was gradually charged so that the temperature rise was 2° C. or less, and stirred with a mechanical stirrer for 30 minutes. Then, pyromellitic acid dianhydride (PMDA) (4.7 g) was gradually charged in several times so that the temperature rise was 2° C. or less, thereby synthesizing a polyimide precursor solution wherein polyimide precursor was dissolved (solid content of 18% by mass). The molar ratio (TMPBPTME: PMDA) between TMPBPTME of the tetracarboxylic acid dianhydride used in the polyimide precursor and PMDA was 95:5. The weight average molecular weight of the polyimide precursor was 75,000.

To a separable flask of 5 L, the polyimide precursor solution (2162 g) cooled to room temperature was added under a nitrogen atmosphere. Dehydrated N,N-dimethylacetamide (432 g) was added thereto, and stirred until uniform. Then, pyridine (6.622 g) which is a catalyst, and acetic acid anhydride (213.67 g) were added and stirred at room temperature for 24 hours to synthesize a polyimide solution.

To the obtained polyimide solution, N,N-dimethylacetamide (DMAc) (2000 g) was added and stirred until uniform. Then, the polyimide solution was transferred and divided to 5 L beakers into equal thirds, and isopropyl alcohol (3500 g) was gradually added to each of the beakers to obtain white slurry. The slurry was transferred onto a Buchner funnel, filtered, and then, a process of washing by running with isopropyl alcohol (total of 9000 g) and then filtering, was repeated for three times, and dried at 110° C. using a vacuum dryer to obtain polyimide (polyimide powder). The weight average molecular weight of the polyimide measured by GPC was 100,000.

To the polyimide, N,N-dimethylacetamide (DMAc) was added so that the solid content concentration of the polyimide was 12% by mass, and a polyimide varnish (resin composition) including 12% by mass of the polyimide in varnish was prepared. The viscosity of the polyimide varnish (resin composition) (solid content concentration: 12% by mass) at 25° C. was 15000 cps.

The primer layer was coated with the polyimide varnish (resin composition) so as to have a predetermined thickness, and dried at 100° C. for 10 minutes, at 150° C. for 10 minutes, and at 230° C. for 30 minutes to form a resin layer with a thickness of 5 μm to 60 μm.

Comparative Example 1-1

A member for a display device was prepared in the same manner as in Example 1-1, except that the resin layer was formed as described below.

A composition including urethane-modified copolyester resin (Vylon UR4800 from Toyobo Co., Ltd.) was applied so as to have a predetermined thickness, and dried at 100° C. for 5 minutes to form a resin layer with a thickness of 5 μm to 60 μm.

Comparative Example 1-2

A member for a display device was prepared in the same manner as in Example 1-1, except that the resin layer was formed as described below.

A composition including epoxy resin (1256B40 from Mitsubishi Chemical Corporation) was applied so as to have a predetermined thickness, and dried at 80° C. for 5 minutes, and at 150° C. for 60 minutes to form a resin layer with a thickness of 5 μm to 60 μm.

Comparative Example 1-3

A member for a display device was prepared in the same manner as in Example 1-1, except that the resin layer was formed as described below.

To a container, 500 g of dehydrated N,N-dimethylacetamide (boiling point: 165° C.) was added, flowing $N_2$ into the container, the N,N-dimethylacetamide was heated at approximately 80° C. while stirring. Monitoring the dissolved oxygen amount in the N,N-dimethylacetamide point to point, the heating was stopped at the point when the dissolved oxygen amount in the N,N-dimethylacetamide was at the detection limit (less than 0.005 mg/L) or less of the dissolved oxygen meter, and after cooling thereof to room temperature, the N,N-dimethylacetamide was subjected to the next process.

The following process was carried out under a nitrogen atmosphere. To a separable flask of 500 mL, 466.1 g of the N,N-dimethylacetamide and 2.46 g (10 mmol) of 1,3-bis(3-aminopropyl)tetramethyldisiloxane (AprTMOS) were added, and to a solution to which the AprTMOS was dissolved and the liquid temperature being controlled to 30° C., 1.23 g (3 mmol) of a 4,4'-(hexafluoroisopropylidene) diphthalic acid anhydride (6FDA) was gradually charged so that the temperature rise was 2° C. or less, and stirred with a mechanical stirrer for 30 minutes. To there, 60.8 g (190 mmol) of 2,2'-bis(trifluoromethyl)benzidine (TFMB) was added, 91.6 g (206 mmol) of 4,4'-(hexafluoroisopropylidene)diphthalic acid anhydride (6FDA) was charged gradually in several times so that the temperature rise was 2° C. or less, thereby synthesizing a polyimide precursor solution wherein polyimide precursor was dissolved (solid content of 25% by mass). The molar ratio between TEMB and AprTMOS used in the polyimide precursor was 95:5. The viscosity of the polyimide precursor solution (solid content:

25% by mass) at 25° C. was 48900 cps, and the weight average molecular weight of the polyimide precursor measured by GPC was 156400.

To a separable flask of 5 L, the polyimide precursor solution cooled to room temperature was added under a nitrogen atmosphere. Dehydrated N,N-dimethylacetamide was added thereto, and stirred until uniform. Then, pyridine which is a catalyst, and acetic acid anhydride were added and stirred at room temperature for 24 hours to synthesize a polyimide solution.

To the obtained polyimide solution, N,N-dimethylacetamide (DMAc) was added and stirred until uniform. Then, the polyimide solution was transferred and divided to 5 L beakers into equal thirds, and isopropyl alcohol was gradually added to each of the beakers to obtain white slurry. The slurry was transferred onto a Buchner funnel, filtered, and then, a process of washing by running with isopropyl alcohol and then filtering, was repeated for three times, and dried at 110° C. using a vacuum dryer to obtain polyimide (polyimide powder).

To the polyimide, N,N-dimethylacetamide (DMAc) was added so that the solid content concentration of the polyimide was 12% by mass, and a polyimide varnish (resin composition) including 12% by mass of the polyimide in varnish was prepared. The viscosity of the polyimide varnish (resin composition) (solid content: 12% by mass) at 25° C. was 3000 cps.

The primer layer was coated with the polyimide varnish (resin composition) so as to have a predetermined thickness, and dried at 100° C. for 10 minutes, at 150° C. for 10 minutes, and at 230° C. for 30 minutes to form a resin layer with a thickness of 5 μm to 60 μm.

[Evaluation 1]

(1) Composite Elastic Modulus

The composite elastic modulus of the resin layer of the member for a display device in Examples and Comparative Examples was determined.

Firstly, the indentation hardness of the resin layer was measured. The measurement of the indentation hardness ($H_{IT}$) of a measurement sample was carried out using "TI950 TriboIndenter" from Bruker Corporation. Specifically, at first, a block wherein a member for a display device cut out to a size of 1 mm×10 mm was embedded in an embedding resin was prepared, and a uniform section with a thickness of 50 nm or more and 100 nm or less without a hole, for example, is cut out from this block by a common section preparing method. For the preparation of the section, "Ultramicrotome EM UC7" (from Leica Microsystems, Inc.) was used. Then, the remaining of the block from which this uniform section without a hole, for example, is cut out was used as a measurement sample. Then, onto the cross-section in such the measurement sample obtained by cutting out the section, a Berkovich indenter (a triangular pyramid, TI-0039 from Bruker Corporation) as the indenter was compressed perpendicularly onto the center of the cross-section of the resin layer, under the following conditions; taking 10 seconds, until the maximum compressing load of 25 μN. Here, in order to avoid an influence of the glass substrate, and in order to avoid an influence of the side edge of the resin layer, the Berkovich indenter was compressed into a portion of the resin layer which is 500 nm away from the interface between the glass substrate and the resin layer toward the center of the resin layer, 500 nm away from both side edges of the resin layer respectively toward the center of the resin layer, and also 500 nm away from the interface between the hard coating layer and resin layer toward the center of the resin layer. Then, after relieving the remaining stress by keeping constant, the load was unloaded in 10 seconds, the maximum load after relieving was measured, and by using the maximum load $P_{max}$ (μN) and the contact projection area $A_p$ ($nm^2$), the indentation hardness ($H_{IT}$) was calculated by $P_{max}/A_p$. The contact projection area was a contact projection area wherein the indenter tip curvature was corrected by Oliver-Pharr method, using a reference sample fused silica (5-0098 from Bruker Corporation). Incidentally, when a value deviating ±20% or more from the arithmetic average value was included in the measured value, that measured value was excluded, and the measurement was carried out for one more time.

(Measurement Conditions)

Loading speed: 2.5 μN/second

Retention time: 5 seconds

Unloading speed: 2.5 μN/second

Measuring temperature: 25° C.

Then, the composite elastic modulus was determined from the mathematical formula (1), using the contact projection area $A_p$ obtained when measuring the indentation hardness ($H_{IT}$) of the obtained resin layer. As for the composite elastic modulus, the indentation hardness was measured at 10 places, determining the composite elastic modulus each time, and the arithmetic average value of the obtained composite elastic modulus of 10 places was regarded as the composite elastic modulus.

(2) Impact Test (Pen Dropping Test)

Figure 12:
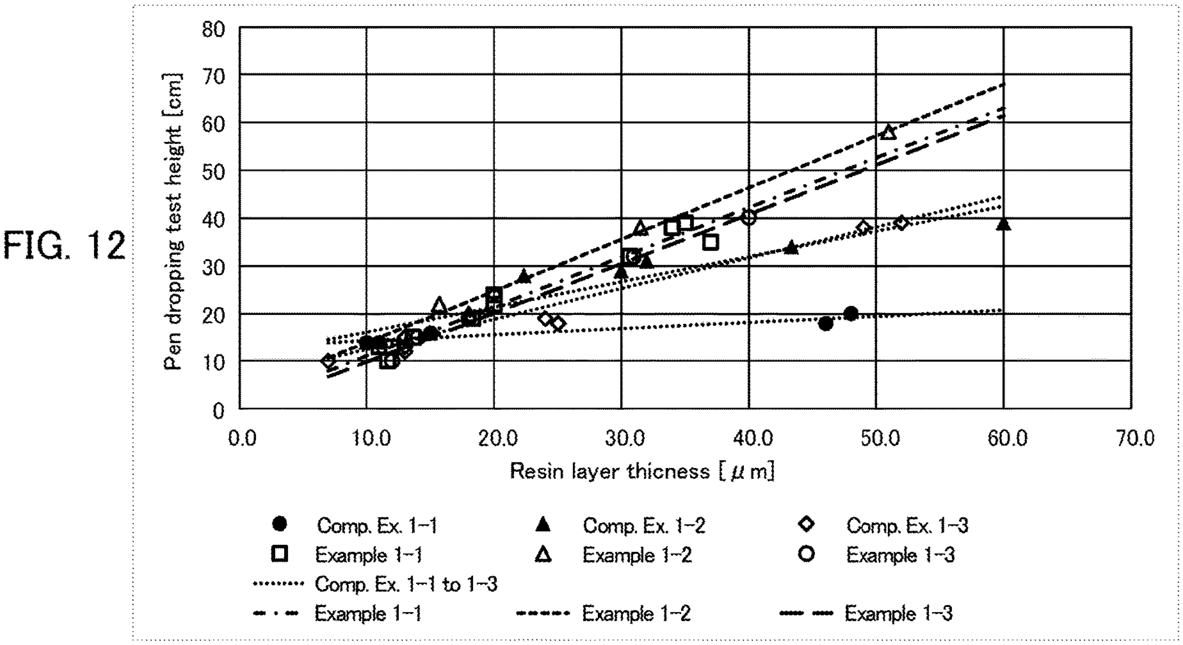
FIG. 12 is a graph showing the relationship between the thickness of the resin layer and the evaluation in the impact test (pen-dropping test) in the resin member for a display device in Examples and Comparative Examples.

An impact test was carried out to the member for a display device in Examples and Comparative Examples. Firstly, on the glass substrate surface of the member for a display device, an optical clear adhesive (OCA) and a PET were adhered in this order, the member for a display device was placed on a metal plate with a thickness of 30 mm so that the PET side was in contact with the metal plate. Then, a pen was dropped, from a testing height, onto the member for a display device with the pen tip downward, and the maximum testing height at which the glass substrate was not broken, was evaluated. The results of the member for a display device in Examples 1-1 to 1-2 and Comparative Examples 1-1 to 1-3 are shown in FIG. 12. Also, the results when the thickness of the resin layer was 40 μm are shown in Table 1.

(3) Pencil Hardness

For the member for a display device in Examples and Comparative Examples, the pencil hardness of the hard coating layer side surface of the member for a display device, when the thickness of the resin layer was 20 μm, was measured according to JIS K5600-5-4 (1999). When measuring the pencil hardness, a pencil hardness tester (trade name "Scratch Hardness Tester by Pencil Tester" (electrically operated) from Toyoseiki Co.) was used, and the measurement conditions were angle of 45°, load of 750 g, speed of 0.5 mm/sec or more and 1 mm/sec or less, and temperature of 23±2° C.

(4) Total Light Transmittance and Haze

For the member for a display device in Examples and Comparative Examples, the total light transmittance and haze of the member for a display device, when the thickness of the resin layer was 20 μm, were measured. The total light transmittance of the member for a display device was measured according to JIS K7361-1 with a haze meter (HM150 from Murakami Color Research Laboratory Co., Ltd). Also, the haze of the member for a display device was measured according to JIS K-7136 with a haze meter (HM150 from Murakami Color Research Laboratory Co., Ltd).

(5) Bending Resistance

For the member for a display device in Examples and Comparative Examples, a dynamic bending test and a static bending test were carried out to the member for a display device, when the thickness of the resin layer was 20 μm, and the bending resistance was evaluated.

(5-1) Dynamic Bending Test

A dynamic bending test was carried out to the member for a display device in Examples and Comparative Examples, and the bending resistance was evaluated. Specifically, at first, short sides (20 mm) of a member for a display device having a size of 20 mm×100 mm were respectively fixed by fixing portions, to an endurance testing machine (trade name "DLDMLH-FS" from Yuasa System Co., Ltd.). As shown in FIG. 5C, the minimum distance "d" between the two opposing short side portions was adjusted to be 10 mm, and a dynamic bending test wherein the surface of the member for a display device was folded into 180° was repeated for 200,000 times. In doing so, the member for a display device was folded so that the hard coating layer side surface of the member for a display device was on the inner side, and the glass substrate side surface of the member for a display device was on the outer side. Also, using another member for a display device, a dynamic bending test wherein the member for a display device was folded so that the hard coating layer side surface of the member for a display device was on the outer side, and the glass substrate side surface of the member for a display device was on the inner side, was carried out in the same manner as described above. Then, by taking the fixing portion off from one short side portion after the dynamic bending test, the folded condition was dissolved, and the opening angle (refer to FIG. 6B) that is an angle the member for a display device opens naturally, was measured. The smaller angle was employed as the opening angle, among a case wherein the member for a display device was folded so that the hard coating layer was on the inner side, and a case wherein the member for a display device was folded so that the hard coating layer was on the outer side.

(5-2) Static Bending Test

A static bending test was carried out to the member for a display device in Examples and Comparative Examples, and the opening angle after the static bending test was measured. Specifically, at first, short sides (20 mm) of a member for a display device having a size of 20 mm×100 mm were respectively fixed by parallelly arranged fixing portions so that distance "d" between the opposing short side portions of the member for a display device was 10 mm, and a static bending test wherein the member for a display device is left to stand at 23° C. for 240 hours under a folded condition, was carried out. Then, by taking the fixing portion off from one short side portion after the static bending test, the folded condition was dissolved, and after 30 minutes at room temperature, the opening angle (refer to FIG. 6B) that is an angle the member for a display device opens naturally, was measured. The static bending test was carried out for both of the following cased: a case wherein the member for a display device was folded so that the hard coating layer was on the inner side, and a case wherein the member for a display device was folded so that the hard coating layer was on the outer side, and the smaller angle was employed as the opening angle.

TABLE 1

| | Composite elastic modulus | Pencil hardness Resin layer thickness | | Total light transmittance | Haze | Bending resistance After 200,000 dynamic bending test | Bending resistance After static bending test 23° C., 240 hrs. | Pen dropping test height |
|---|---|---|---|---|---|---|---|---|
| | (GPa) | 10 μm | 40 μm | (%) | (%) | (°) | (°) | (cm) |
| Example 1-1 | 6.71 | 4H | 3H | 90.4 | 0.6 | 180 | 170 | 42.1 |
| Example 1-2 | 8.29 | 5H | 4H | 89.9 | 0.5 | 180 | 175 | 46.2 |
| Example 1-3 | 6.02 | 4H | 3H | 90.9 | 0.5 | 180 | 170 | 40.1 |
| Comp. Ex. 1-1 | 5.29 | 3H | 3B | 89.3 | 0.6 | 175 | 165 | 18.6 |
| Comp. Ex. 1-2 | 5.42 | 3H | 2H | 88.9 | 0.7 | 175 | 165 | 31.0 |
| Comp. Ex. 1-3 | 5.61 | 3H | 2H | 90.6 | 0.4 | 180 | 165 | 31.2 |

As shown in Table 1 and FIG. 12, since the composite elastic modulus of the resin layer was less than the predetermined value in Comparative Examples 1-1 to 1-3, the surface hardness of the member for a display device decreased when the thickness of the resin layer was thick. In contrast to this, since the composite elastic modulus of the resin layer was the predetermined value or more in Examples 1-1 to 1-3, the surface hardness was high also in a case wherein, for example, the thickness of the resin layer was 40 μm, and it was found out that it was possible to realize both impact resistance and surface hardness. Also, from Table 1 and FIG. 12, it was confirmed that, when the composite elastic modulus of the resin layer was the predetermined value or more, the increase rate of the impact resistance associated with the increase of the thickness of the resin layer was increased. Also, in Table 1, from the comparison between Examples 1-1 to 1-3 and Comparative Example 1-1 to 1-3, it was found out that, when the composite elastic modulus of the resin layer is the predetermined value or more, the bending resistance tends to be improved. This is because as the composite elastic modulus of the resin layer got higher, the restoring force when the resin layer was deformed was increased.

Hereinafter, in Comparative Examples 2-1 to 2-2 and Examples 2-1 to 2-9, a hard coating layer formed on the third resin layer is referred to as a first hard coating layer, and a hard coating layer formed on the first resin layer is referred to as a second hard coating layer.

Comparative Example 2-1

(1) Formation of Primer Layer

A primer layer with a thickness of 1 μm was formed on a glass substrate in the same manner as the formation of the primer layer in Example 1-1.

(2) Formation of First Resin Layer

A first resin layer with a thickness of 20 μm was formed on the primer layer in the same manner as the formation of the resin layer in Example 1-1.

(3) Formation of Second Hard Coating Layer

A second hard coating layer with a thickness of 10 μm was formed on the first resin layer in the same manner as the formation of the hard coating layer in Example 1-1. Thereby, an optical stacked body was obtained.

Comparative Example 2-2

(1) Production of Hard Coating Film

As a third resin layer, a PET film (trade name: A4100 from Toyobo Co., Ltd) with a thickness of 50 μm was prepared, and the PET film was coated with a curable resin composition for a hard coating layer similar to that in Example 1-1 was formed by a bar coater to form a coating film. Thereafter, the formed coating film was dried at 100° C. for 3 minutes, and then, cured by irradiating ultraviolet rays of 200 mJ to form a first hard coating layer with a thickness of 10 μm. Thereby, a hard coating film was obtained.

(2) Production of Optical Stacked Body

A chemically strengthened glass substrate with a thickness of 70 μm was prepared, and by using an acrylic based pressure-sensitive adhesive film (trade name: 8146-2, from 3M Corporation) with a thickness of 50 μm, the glass substrate and the PET film side surface of the hard coating film were adhered. Thereby, an optical stacked body was obtained.

Examples 2-1 to 2-8

(1) Production of Glass-Resin Stacked Body

A primer layer and a first resin layer were formed on a glass substrate in the same manner as in Comparative Example 2-1, except that the thickness of the first resin layer was 10 μm to 40 μm. Thereby, a glass-resin stacked body was obtained.

(2) Production of Hard Coating Film

A hard coating film was produced in the same manner as in Comparative Example 2-2.

(3) Production of Optical Stacked Body

The first resin layer side surface of the glass-resin stacked body, and the PET film side surface of the hard coating film were adhered by using an acrylic based pressure-sensitive adhesive film (trade name: 8146-2, from 3M Corporation) with a thickness of 10 μm to 50 μm. Thereby, an optical stacked body was produced.

Example 2-9

(1) Production of Glass-Resin Stacked Body

A primer layer, a first resin layer, and a second hard coating layer were formed on a glass substrate in the same manner as in Comparative Example 2-1, except that the thickness of the first resin layer was 23 μm. Thereby, a glass-resin stacked body was obtained.

(2) Production of Hard Coating Film

A hard coating film was produced in the same manner as in Comparative Example 2-2.

(3) Production of Optical Stacked Body

The second hard coating layer side surface of the glass-resin stacked body, and the PET film side surface of the hard coating film were adhered by using an acrylic based pressure-sensitive adhesive film (trade name: 8146-2, from 3M Corporation) with a thickness of 50 μm. Thereby, an optical stacked body was produced.

[Evaluation 2]

(1) Composite Elastic Modulus

The composite elastic modulus of the first resin layer of the optical stacked body in Examples and Comparative Examples was determined.

Firstly, the indentation hardness of the first resin layer was measured. The measurement of the indentation hardness ($H_{IT}$) of a measurement sample was carried out using "TI950 TriboIndenter" from Bruker Corporation. Specifically, at first, a block wherein a member for an optical stacked body cut out to a size of 1 mm×10 mm was embedded in an embedding resin was prepared, and a uniform section with a thickness of 50 nm or more and 100 nm or less without a hole, for example, was cut out from this block by a common section preparing method. For the preparation of the section, "Ultramicrotome EM UC7" (from Leica Microsystems, Inc.) was used. Then, the remaining of the block from which this uniform section without a hole, for example, was cut out was used as a measurement sample. Then, onto the cross-section in such the measurement sample obtained by cutting out the section, a Berkovich indenter (a triangular pyramid, TI-0039 from Bruker Corporation) as the indenter was compressed perpendicularly onto the center of the cross-section of the first resin layer, under the following conditions, taking 10 seconds, until the maximum compressing load of 25 μN. Here, in order to avoid an influence of the glass substrate, and in order to avoid an influence of the side edge of the first resin layer, the Berkovich indenter was compressed into a portion of the first resin layer which was 500 nm away from the interface between the glass substrate and the first resin layer toward the center of the first resin layer, and 500 nm away from both side edges of the first resin layer respectively toward the center of the first resin layer. Then, after relieving the remaining stress by keeping constant, the load was unloaded in 10 seconds, the maximum load after relieving was measured, and by using the maximum load $P_{max}$(μN) and the contact projection area $A_p$ ($nm^2$), the indentation hardness ($H_{IT}$) was calculated by $P_{max}/A_p$. The contact projection area was a contact projection area wherein the indenter tip curvature was corrected by Oliver-Pharr method, using a reference sample fused silica (5-0098 from Bruker Corporation). Incidentally, when a value deviating ±20% or more from the arithmetic average value was included in the measured value, that measured value was excluded, and the measurement was carried out for one more time.

(Measurement Conditions)

Loading speed: 2.5 μN/second
Retention time: 5 seconds
Unloading speed: 2.5 μN/second
Measuring temperature: 25° C.

Then, the composite elastic modulus was determined from the mathematical formula (1), using the contact projection area $A_p$ obtained when measuring the indentation hardness ($H_{IT}$) of the obtained first resin layer. As for the composite elastic modulus, the indentation hardness was measured at 10 places, determining the composite elastic modulus each time, and the arithmetic average value of the obtained composite elastic modulus of 10 places was regarded as the composite elastic modulus.

(2) Impact Test (Pen Dropping Test)

An impact test was carried out to the optical stacked body in Examples and Comparative Examples. Firstly, on the glass substrate side surface of the optical stacked body, an optical clear adhesive film (OCA) with a thickness of 50 μm and a PET film with a thickness of 100 μm were adhered in this order to produce a stacked body for a test. The stacked body for a test was placed on a metal plate with a thickness of 30 mm so that the PET side surface of this stacked body for a test was in contact with the metal plate. Then, a pen was dropped, from a testing height, onto the stacked body for a test with the pen tip downward. As the pen, Blen 0.5 BAS88-BK (weight: 12 g, pen tip p: 0.5 mm) from Zebra Co., Ltd. was used. The maximum testing height at which the glass substrate was not broken, and the minimum testing heigh at which the glass substrate was broken are shown in Table 1.

(3) Dynamic Bending Test

A dynamic bending test was carried out to the optical stacked body in Examples and Comparative Examples, and the bending resistance was evaluated. Specifically, at first, short sides (20 mm) of an optical stacked body having a size of 20 mm×100 mm are respectively fixed by fixing portions, to an endurance testing machine (trade name "DLDMLH-FS" from Yuasa System Co., Ltd.). As shown in FIG. 5C, the minimum distance "d" between the two opposing short side portions was adjusted to be 10 mm or 8 mm, and a dynamic bending test wherein the surface of the optical stacked body was folded into 180°, was repeated for 200,000 times or 70,000 times. In doing so, the optical stacked body was folded so that the hard coating layer side surface of the optical stacked body was on the outer side, and the glass substrate side surface of the optical stacked body was on the inner side. Under an atmosphere of 25° C. and 50% RH, in a bright room of 2000 Lx, whether a crack or a fracture occurred at the bent portion or not was observed visually. The results of the dynamic bending test were evaluated based on the following criteria.

A: No crack or fracture occurred at the bent portion

B: a crack or a fracture occurred at the bent portion

Since the second resin layer and third resin layer were not placed in Comparative Example 2-1, the impact resistance was inferior. Also, since the first resin layer was not placed in Comparative Example 2-2, the impact resistance was inferior. In contrast to this, since the predetermined first resin layer, second resin layer, and third resin layer were placed in this order in Examples 2-1 to 2-9, the impact resistance was excellent. Also, comparing Examples 2-1 to 2-7 with Comparative Example 2-8, when the total thickness of the resin layers was the predetermined value or less, the bending resistance was also excellent.

REFERENCE SIGNS LIST

1: member for a display device
2: glass substrate
3: resin layer
4: hard coating layer
11: optical stacked body
12: glass substrate
13: first resin layer
14: second resin layer
15: third resin layer
16: hard coating layer

The invention claimed is:

1. A member for a display device comprising:

a glass substrate with a thickness of 100 μm or less;

a resin layer on one surface side of the glass substrate, a composite elastic modulus of the resin layer being 6.0

TABLE 2

| | | Comp. Ex. 2-1 | Comp. Ex. 2-2 | Example 2-1 | Example 2-2 | Example 2-3 | Example 2-4 | Example 2-5 | Example 2-6 | Example 2-7 | Example 2-8 | Example 2-9 |
|---|---|---|---|---|---|---|---|---|---|---|---|---|
| Primer layer thickness (μm) | | 1 | — | 1 | 1 | 1 | 1 | 1 | 1 | 1 | 1 | 1 |
| First resin layer thickness (μm) | | 20 | — | 10 | 20 | 20 | 20 | 30 | 30 | 30 | 40 | 23 |
| Second hard coating layer thickness (μm) | | 10 | — | — | — | — | — | — | — | — | — | 10 |
| Second resin layer thickness (μm) | | — | 50 | 50 | 10 | 25 | 50 | 10 | 25 | 50 | 50 | 50 |
| Third resin layer thickness (μm) | | — | 50 | 50 | 50 | 50 | 50 | 50 | 50 | 50 | 50 | 50 |
| First hard coating layer thickness (μm) | | — | 10 | 10 | 10 | 10 | 10 | 10 | 10 | 10 | 10 | 10 |
| Resin layers total thickness (μm) | | 31 | 110 | 121 | 91 | 106 | 131 | 101 | 116 | 141 | 151 | 144 |
| First resin layer composite elastic modulus (GPa) | | 6.71 | | 6.71 | 6.71 | 6.71 | 6.71 | 6.71 | 6.71 | 6.71 | 6.71 | 6.71 |
| Bending test (d: 10 mm, 200,000 times) | | A | A | A | A | A | A | A | A | A | A | A |
| Bending test (d: 8 mm, 70,000 times) | | A | A | A | A | A | A | A | A | A | B | B |
| Pen dropping test height (cm) | No glass crack | 28 | 30 | 55 | 37 | 55 | 65 | 60 | 70 | 100 | 100 | 80 |
| | Glass cracked | 29 | 33 | 60 | 40 | 60 | 70 | 70 | 80 | | | 90 |

GPa or more and 20 GPa or less, and a thickness of the resin layer being 5 μm or more and 60 μm or less; and a hard coating layer on the resin layer, on a surface opposite to the glass substrate side, wherein a layer including a resin is present only on one surface side of the glass substrate;

the glass substrate is a chemically strengthened glass;

the resin layer includes a polyimide or a polyamideimide;

the hard coating layer includes an ultraviolet absorber;

after a test in which the member for a display device is parallelly folded so that the glass substrate is on an inner side, and a distance between two opposing short side portions of the member for a display device is 10 mm, left to stand at 23° C. for 240 hours in a folded condition, and then relieved from the folded condition, the opening angle of the member for a display device, after 30 minutes at room temperature, is 130° or more; and after a test in which the member for a display device is parallelly folded so that the glass substrate is on an outer side, and a distance between two opposing short side portions of the member for a display device is 10 mm, left to stand at 23° C. for 240 hours under a folded condition, and then relieved from the folded condition, the opening angle of the member for a display device, after 30 minutes at room temperature, is 130° or more.

2. The member for a display device according to claim 1, wherein a primer layer is included between the glass substrate and the resin layer.

3. The member for a display device according to claim 1, wherein a total light transmittance thereof is 80% or more.

4. The member for a display device according to claim 1, wherein a haze thereof is 2.0% or less.

5. The member for a display device according to claim 1, wherein the polyimide is present and a weight average molecular weight of the polyimide is 100,000 or more.

6. The member for a display device according to claim 1, wherein the polyamideimide is present and a weight average molecular weight of the polyamideimide is 50,000 or more.

7. The member for a display device according to claim 1, wherein a peak of the absorption wavelength of the ultraviolet absorber is in a range of 300 nm or more and 390 nm or less.

8. The member for a display device according to claim 7, wherein an initiator for curing the hard coating layer has an absorption wavelength of 250 nm.

9. An optical stacked body comprising a glass substrate, a first resin layer, a second resin layer, and a third resin layer, in this order, wherein a layer including a resin is present only on one surface side of the glass substrate;

a thickness of the glass substrate is 100 μm or less;

a composite elastic modulus of the first resin layer is 6.0 GPa or more and 20 GPa or less, and a thickness of the first resin layer is 5 μm or more and 60 μm or less;

the first resin layer includes a polyimide or a polyamideimide;

the second resin layer is a pressure-sensitive adhesive layer;

the third resin layer is a resin film including a resin selected from a group consisting of a polyester based resin, a polycycloolefin based resin, an acetylcellulose based resin, a polycarbonate based resin, and a polypropylene based resin;

the glass substrate is a chemically strengthened glass;

a hard coating layer is present on the third resin layer, on a surface opposite to the second layer side;

the hard coating layer includes an ultraviolet absorber;

after a test in which the optical stacked body is parallelly folded so that the glass substrate is on an inner side, and a distance between two opposing short side portions of the optical stacked body is 10 mm, left to stand at 23° C. for 240 hours under a folded condition, and then relieved from the folded condition, the opening angle of the optical stacked body, after 30 minutes at room temperature, is 130° or more; and after a test in which the optical stacked body is parallelly folded so that the glass substrate is on an outer side, and a distance between two opposing short side portions of the optical stacked body is 10 mm, left to stand at 23° C. for 240 hours under a folded condition, and then relieved from the folded condition, the opening angle of the optical stacked body, after 30 minutes at room temperature, is 130° or more.

10. The optical stacked body according to claim 9, wherein a total thickness of the resin layers placed on a first resin layer surface side of the glass substrate is 143 μm or less.

11. The optical stacked body according to claim 9, wherein a total light transmittance thereof is 80% or more.

12. The optical stacked body according to claim 9, wherein a haze thereof is 2.0% or less.

13. The optical stacked body according to claim 9, wherein the polyimide is present and a weight average molecular weight of the polyimide is 100,000 or more.

14. The optical stacked body according to claim 9, wherein the polyamideimide is present and a weight average molecular weight of the polyamideimide is 50,000 or more.

15. A display device comprising:

a display panel, and (a) a member for a display device comprising:

a glass substrate with a thickness of 100 μm or less;

a resin layer placed on one surface side of the glass substrate, a composite elastic modulus of the resin layer being 6.0 GPa or more and 20 GPa or less, and a thickness of the resin layer being 5 μm or more and 60 μm or less; and a hard coating layer on the resin layer, on a surface opposite to the glass substrate side, wherein a layer including a resin is present only on one surface side of the glass substrate, the glass substrate is a chemically strengthened glass, the resin layer includes a polyimide or a polyamideimide, the hard coating layer includes an ultraviolet absorber, after a test in which the member for a display device is parallelly folded so that the glass substrate is on an inner side, and a distance between two opposing short side portions of the member for a display device is 10 mm, left to stand at 23° C. for 240 hours in a folded condition, and then relieved from the folded condition, the opening angle of the member for a display device, after 30 minutes at room temperature, is 130° or more, and after a test in which the member for a display device is parallelly folded so that the glass substrate is on an outer side, and a distance between two opposing short side portions of the member for a display device is 10 mm, left to stand at 23° C. for 240 hours under a folded condition, and then relieved from the folded condition, the opening angle of the member for a display device, after 30 minutes at room temperature, is 130° or more placed on an observer side of the display panel, or (b) the optical stacked body according to claim 9 placed on an observer side of the display panel.

16. The display device according to claim 15, wherein the display device is foldable.

* * * * *